United States Patent
Otsuka

(10) Patent No.: US 7,151,921 B2
(45) Date of Patent: Dec. 19, 2006

(54) MANAGEMENT APPARATUS, MANAGEMENT SYSTEM, MANAGEMENT METHOD, AND MANAGEMENT PROGRAM FOR MEMORY CAPACITY OF MOBILE TERMINALS

(75) Inventor: Osamu Otsuka, Tokyo (JP)

(73) Assignee: NEC Corporation, Tokyo (JP)

( * ) Notice: Subject to any disclaimer, the term of this patent is extended or adjusted under 35 U.S.C. 154(b) by 414 days.

(21) Appl. No.: 10/674,525

(22) Filed: Oct. 1, 2003

(65) Prior Publication Data

US 2004/0068634 A1 Apr. 8, 2004

(30) Foreign Application Priority Data

Oct. 2, 2002 (JP) ............................. 2002-289947

(51) Int. Cl.
H04M 1/725 (2006.01)
(52) U.S. Cl. .................... 455/412.1; 709/216; 711/170
(58) Field of Classification Search ................ 709/203, 709/206, 216; 707/10; 711/170, 171, 173, 711/154, 165; 455/412.1
See application file for complete search history.

(56) References Cited

U.S. PATENT DOCUMENTS 6,101,505 A 8/2000 Sun

2002/0049826 A1 4/2002 Ariga
2002/0082048 A1* 6/2002 Toyoshima ................. 455/557

FOREIGN PATENT DOCUMENTS

JP 2001-184240 7/2001
JP 2001-358753 12/2001

* cited by examiner

Primary Examiner—Hong Kim
(74) Attorney, Agent, or Firm—McGinn IP Law Group, PLLC

(57) ABSTRACT

A management system for memory capacity, in which vacant capacity of a memory in a mobile terminal is secured in case that the mobile terminal has a shortage in its memory for obtaining a large amount of data and the large amount of data can be stored in the mobile terminal, is provide. An Internet service management server provides a data management means that makes some data storing in a mobile terminal transfer to a data memorizing means in the Internet service management server. The data management means compares the amount of data, which the mobile terminal desires to obtain from the Internet, with vacant capacity of the mobile terminal. When the vacant capacity of the mobile terminal is not sufficient for obtaining the amount of data desired to obtain by the mobile terminal, the data management means makes some data storing in the mobile terminal transfer to the data memorizing means in the Internet service management server. With this, the vacant capacity for the amount of data desired to obtain by the mobile terminal can be secured in the mobile terminal.

28 Claims, 12 Drawing Sheets

MANAGEMENT APPARATUS, MANAGEMENT SYSTEM, MANAGEMENT METHOD, AND MANAGEMENT PROGRAM FOR MEMORY CAPACITY OF MOBILE TERMINALS

BACKGROUND OF THE INVENTION

The present invention relates to a management apparatus, a management system, a management method, and a management program for memory capacity in mobile terminals such as mobile communication terminals, which communicate with each other via a network.

DESCRIPTION OF THE RELATED ART

Recently, a rapid access service by a ubiquitous computing network has begun to prevail in the market. By this service, an environment, in which each communication instrument can receive contents having a large amount of information at any time and anywhere, has been established. With this environment, the limit of the amount of information, which each of the communication instruments can receive, has been removed. By this, the quality of the contents of music and images to be delivered and the quality of the contents in electronic commerce can be improved. That is, the users of the communication instruments have been able to obtain so-called "rich contents" at any time and anywhere. The limit of the amount of information, which each of the communication instruments can receive, has been removed. This signifies that the limit of the amount of information, which each of the communication instruments can transmit, has been also removed. Consequently, the environment, which each of the communication instruments transmits some information continuously at various places, has been established.

For example, at a mobile terminal such as a cellular phone, not only speech communication but also image communication and high speed data communication have been able to be executed. That is, multimedia communication at the mobile terminal has prevailed. In this multimedia communication, the mobile terminal has provided functions such as a function connecting to the Internet. And in order to store the received and transmitting data, the mobile terminal provides memories such as RAMs and flash memories.

FIG. 1 is a block diagram showing the structure of a conventional mobile terminal. Referring to FIG. 1, the structure of the conventional mobile terminal is explained.

As shown in FIG. 1, the conventional mobile terminal provides an antenna 121, a transmitting and receiving section 122, a coding and decoding section 123, a memorizing section 124, an inputting and outputting section 125, and a controller 126.

The antenna 121 and the transmitting and receiving section 122 execute the transmission and the reception of radio waves based on the communication system of the mobile terminal. As the communication system, the wideband code division multiple access (W-CDMA) system can be used. At the W-CDMA system, the antenna 121 and the transmitting and receiving section 122 are composed of a coupler, an oscillator, a phase locked loop (PLL) circuit, a modulator and demodulator (MODEM), a spreader and de-spreader for processing base band signals, a rake receiver, and so on.

The coding and decoding section 123 applies coding to the transmitting data and decoding to the received data. And a coding and decoding system, which corresponds to the format of the transmitting and receiving data and the communication system of the mobile terminal, is used at the coding and decoding section 123. At the coding and decoding section 123, for example, in case that the transmitting and received data for the speech communication are coded and decoded, a pulse code modulation (PCM) or an adaptive multi-rate (AMR) system can be used. And, in case that the transmitting and received data for the multi media communication are coded and decoded, 3G-324M, H.263, MPEG-4, or MPEG-2 system can be used. As mentioned above, the coding and decoding processing is executed by one of the several coding and decoding systems. In some transmitting and received data, the coding and decoding processing is not needed at the coding and decoding section 123.

The memorizing section 124 stores the transmitting data and the received data. As the memorizing section 124, for example, a memory such as a ROM(s), a RAM(s), an IC card, a memory card, a memory card having a copyright protection function, and a disk unit can be used.

The inputting and outputting section 125 has interface functions with external instruments. For example, the inputting and outputting section 125 provides speech devices such as a microphone and a speaker, a displaying device such as a liquid crystal display (LCD), an input device such as a charge coupled device (CCD), an input keyboard, interface devices for the data communication based on the standards such as the universal serial bus (USB), the IEEE 1394, and the Bluetooth.

The controller 126 controls much operation at the mobile terminal, and provides a radio controlling means 1261 and a data controlling means 1262. The radio controlling means 1261 controls the communication operation and the data controlling means 1262 controls the operation except the operation executing by the radio controlling means 1261.

Next, the operation, at the time when the conventional mobile terminal shown in FIG. 1 received data, is explained. First, the radio controlling means 1261 controls so that the antenna 121 and the transmitting and receiving section 122 receive data of specific frequencies. By this control, the antenna 121 receives specific data from an external communication instrument, and sends the received specific data to the transmitting and receiving section 122. The transmitting and receiving section 122 sends the received specific data to the coding and decoding section 123. The coding and decoding section 123 decodes the data received from the transmitting and receiving section 122 by a control signal from the data controlling means 1262. The coding and decoding section 123 sends the decoded data to the inputting and outputting section 125. The inputting and outputting section 125 outputs the decoded data. The coding and decoding section 123 also sends the decoded data to the memorizing section 124. The memorizing section 124 stores the received decoded data.

As mentioned above, at the conventional mobile terminal, by the control of the radio controlling means 1261, the data from the external communication instrument are received and the received data are stored in the memorizing section 124. However, the memorizing section 124 has fixed memory capacity, consequently, data being exceeded the fixed memory capacity cannot be obtained.

In order to obtain data, whose amount is larger than the vacant capacity of the memorizing section 124, the user selects some data storing in the memorizing section 124, whose importance is little. And the user deletes the selected data in the memorizing section 124, and secures the vacant capacity for the receiving data. That is, this operation is necessary for the user to obtain the data.

In order to solve this problem, there are several technologies. In the first conventional technology, by not deleting the data in the memorizing section 124 of the mobile terminal, but by storing the data in an external memory, the vacant capacity of the memorizing section 124 is secured.

The operation of this technology is explained in detail. First, the inputting and outputting section 125 of the mobile terminal is connected to a personal computer (PC), which works as the external memory, via a communication cable. And the data storing in the memorizing section 124 of the mobile terminal is sent to the PC. That is, the data storing in the memorizing section 124 of the mobile terminal are made to move to the external memory via the communication cable. With this, the data storing in the memorizing section 124 of the mobile terminal are transferred to the external memory, and the vacant capacity of the memorizing section 124 can be secured.

As the second conventional technology, Japanese Patent Application Laid-Open No. 2001-358753 discloses a data storing method at a mobile terminal. In this patent application, in order to store a large amount of data, a Web server is utilized as a large capacity memory.

As the third conventional technology, Japanese Patent Application Laid-Open No. 2001-184240 discloses a memory capacity management apparatus and a method thereof, and a recording medium thereof. In this patent application, in case that a transmitting side terminal transmits data to a receiving side terminal, the transmitting side terminal judges whether the receiving side terminal has memory capacity being more than the amount of data to be transmitted or not. And when the memory capacity in the receiving side terminal is less than the amount of data to be transmitted, the transmitting side terminal makes the receiving side terminal secure the memory capacity being more than the amount of data to be transmitted, by making the receiving side terminal transmit some storing data to the transmitting side terminal.

However, at the first conventional technology, as mentioned above, the mobile terminal is connected to the PC and the data in the mobile terminal are transferred to the memory in the PC. Consequently, when the mobile terminal is used at places being out of his/her house, that is, in the original using state of the mobile terminal, it is impossible that the data are transferred from the mobile terminal to the PC.

At the second conventional technology, when the user of the mobile terminal desires to obtain some data whose amount is large, the user requires the Web server to store the data in the storage of the Web server. After this, the user accesses the Web server and obtains the data storing in the Web server.

However, the second conventional technology discloses only the data storing concept in the storage of the Web server, and does not describe vacant capacity in the mobile terminal and the amount of data that the user desired to obtain. At the second conventional technology, when the user of the mobile terminal requested to store some data in the Web server, the Web server stores the data, and when the user desires to obtain the data, the Web server downloads the data to the mobile terminal. Consequently, the second conventional technology does not teach any method to compare the vacant capacity in the mobile terminal with the amount of data that the user of the mobile terminal desires to obtain. And there is no method comparing the vacant capacity in the mobile terminal with the amount of data that the user of the mobile terminal desires to obtain.

Further, the second conventional technology does not teach when the mobile terminal downloads the data storing in the storage of the Web server.

Therefore, when the mobile terminal accesses the Web server, the mobile terminal cannot compare the amount of data storing in the Web server with the current vacant capacity in the mobile terminal. And the mobile terminal cannot automatically judge whether the current vacant capacity is sufficient or not for the data storing in the Web server. And when the mobile terminal judged that the downloaded data were not able to be stored in the mobile terminal by the shortage of the vacant capacity, the mobile terminal cannot obtain the data.

The third conventional technology is explained in detail. At the memory capacity management method, when data are transmitted from the transmitting side terminal to the receiving side terminal, the transmitting side terminal judges whether the memory in the receiving side terminal has vacant capacity being more than the amount of data to be transmitted from the transmitting side terminal or not. When the vacant capacity is not sufficient for the amount of data to be transmitted from the transmitting side terminal, the receiving side terminal secures the vacant capacity, and it makes possible that the data are transmitted.

In order to secure the vacant capacity, the data storing in the storage of the receiving side terminal are transferred to the storage of the transmitting side terminal, or the data storing in the storage of the receiving side terminal are transferred to the external storage of the receiving side terminal. With this, the vacant capacity being more than the amount of data to be transmitted from the transmitting side terminal is secured.

The third conventional technology is a technology that secures the memory capacity in the receiving side terminal when the transmitting side terminal transmits some data to the receiving side terminal, and is not a technology that secures the memory capacity in the receiving side terminal when the receiving side terminal desires to obtain some data. Furthermore, when the data are transmitted from the transmitting side terminal to the receiving side terminal, the transmitting side terminal must always confirm whether the receiving side terminal has vacant capacity for the data to be transmitted.

SUMMARY OF THE INVENTION

It is therefore an object of the present invention to provide a management apparatus, a management system, a management method, and a management program for memory capacity in mobile terminals such as mobile communication terminals, which communicate with each other via a network. In particular, at the present invention, in case that a mobile terminal has a shortage in its memory for obtaining a large amount of data, vacant capacity of the memory in the mobile terminal for obtaining the large amount of data can be secured. Further, regardless of the current vacant capacity of the memory in the mobile terminal, the data can be stored in the memory of the mobile terminal.

According to a first aspect of the present invention, for achieving the object mentioned above, there is provided a management apparatus for memory capacity. The management apparatus for memory capacity provides a data capacity management means that manages data capacity of mobile terminals that communicate with each other via a network, a transmission judging means that judges whether data to be transmitted to each of the mobile terminals is transmitted or not, by comparing vacant capacity of each of the mobile terminals, which is managed by the data capacity management means, with the amount of the data to be transmitted to each of the mobile terminals, and a transmitting means that obtains some data storing in each of the mobile terminals and stores the obtained data and lets each of the mobile terminals make new vacant capacity when the data to be transmitted were judged not to be transmitted, and transmits the data to be transmitted, which were judged not to be transmitted, to each of the mobile terminals by using the new vacant capacity.

According to a second aspect of the present invention, in the first aspect, the data capacity management means renews the vacant capacity of each of the mobile terminals, when each of the mobile terminals requests to obtain some data from the network, and manages the renewed vacant capacity.

According to a third aspect of the present invention, in the second aspect, the data capacity management means renews the vacant capacity of each of the mobile terminals by receiving the information of the vacant capacity from each of the mobile terminals and manages the renewed vacant capacity.

According to a fourth aspect of the present invention, for achieving the object mentioned above, there is provided a management system for memory capacity. The management system for memory capacity provides mobile terminals that communicate with each other via a network, and a management server having a data memorizing means that stores data from each of the mobile terminals. And each of the mobile terminals provides a data obtaining request transmitting means that transmits a request for obtaining data from the network to the management server. And the management server provides a data capacity management means that manages data capacity of each of the mobile terminals, a transmission judging means that judges whether the data requested by each of the mobile terminals is transmitted to each of the mobile terminals or not, by comparing vacant capacity of each of the mobile terminals, which is managed by the data capacity management means, with the amount of the data requested by the data obtaining request transmitting means, and a transmitting means that obtains some data storing in each of the mobile terminals and stores the obtained data in the data memorizing means and lets each of the mobile terminals make new vacant capacity when the data requested by each of the mobile terminals were judged not to be transmitted, and transmits the data requested by each of the mobile terminals, which were judged not to be transmitted, to each of the mobile terminals by using the new vacant capacity.

According to a fifth aspect of the present invention, in the fourth aspect, each of the mobile terminals further provides a data capacity renewing means that transmits the newest vacant capacity of its own mobile terminal to the management server, and makes the vacant capacity managing by the data capacity management means in the management server renew.

According to a sixth aspect of the present invention, in the fifth aspect, the data capacity renewing means transmits the newest vacant capacity of its own mobile terminal to the management server, and makes the vacant capacity managing by the data capacity management means in the management server renew, when the data obtaining request transmitting means transmits the request for obtaining data from the network to the management server.

According to a seventh aspect of the present invention, in the fifth aspect, the data capacity renewing means transmits the newest vacant capacity of its own mobile terminal to the management server, and makes the vacant capacity managing by the data capacity management means in the management server renew, at the time of the connection of an external instrument to an interface connector of its own mobile terminal.

According to an eighth aspect of the present invention, in the fifth aspect, the data capacity renewing means transmits the newest vacant capacity of its own mobile terminal to the management server, and makes the vacant capacity managing by the data capacity management means in the management server renew, at the time of the location registration of its own mobile terminal.

According to a ninth aspect of the present invention, for achieving the object mentioned above, there is provided a management method for memory capacity at a management apparatus for memory capacity that manages data capacity of mobile terminals that communicate with each other via a network, in which the data capacity of each of the mobile terminals is managed. The management method for memory capacity provides the steps of, judging whether data to be transmitted to each of the mobile terminals is transmitted to each of the mobile terminals or not, by comparing vacant capacity of each of the mobile terminals, which is managed by the management apparatus for memory capacity, with the amount of the data to be transmitted to each of the mobile terminals, obtaining some data storing in each of the mobile terminals and storing the obtained data in the management apparatus for memory capacity, and letting each of the mobile terminals make new vacant capacity when the data to be transmitted to each of the mobile terminals were judged not to be transmitted, and transmitting the data to be transmitted, which were judged not to be transmitted, to each of the mobile terminals by using the new vacant capacity.

According to a tenth aspect of the present invention, in the ninth aspect, the management method for memory capacity further provides the step of renewing the vacant capacity of each of the mobile terminals managing by the management apparatus for memory capacity and managing the renewed vacant capacity by the management apparatus for memory capacity when each of the mobile terminals requests to obtain the data to be transmitted to each of the mobile terminals from the network.

According to an eleventh aspect of the present invention, in the tenth aspect, the vacant capacity of each of the mobile terminals is renewed and managed by the management apparatus for memory capacity by receiving the information of the vacant capacity from each of the mobile terminals.

According to a twelfth aspect of the present invention, there is provided a management method for memory capacity at a management system for memory capacity, which provides mobile terminals that communicate with each other via a network and a management server that manages data capacity of each of the mobile terminals, in which the data capacity of each of the mobile terminals is managed. The management method for memory capacity provides the steps of, transmitting a request for obtaining data from the network by each of the mobile terminals to the management server, judging whether the data requested by each of the mobile terminals is transmitted to each of the mobile terminals or not, by comparing vacant capacity of each of the mobile terminals, which is managed by the management server, with the amount of the data requested by each of the mobile terminals, obtaining some data storing in each of the mobile terminals and storing the obtained data in the management server, and letting each of the mobile terminals make new vacant capacity when the data requested by each of the mobile terminals were judged not to be transmitted, and transmitting the data requested by each of the mobile terminals, which were judged not to be transmitted, to each of the mobile terminals by using the new vacant capacity.

According to a thirteenth aspect of the present invention, in the twelfth aspect, the management method for memory capacity further provides the step of renewing the vacant capacity managing by the management server by transmitting the newest vacant capacity of its own mobile terminal to the management server.

According to a fourteenth aspect of the present invention, in the thirteenth aspect, the vacant capacity of its own mobile terminal is renewed by that the newest vacant capacity of its own mobile terminal is transmitted to the management server, when the request for obtaining the data is transmitted to the management server.

According to a fifteenth aspect of the present invention, in the thirteenth aspect, the vacant capacity of its own mobile terminal is renewed by that the newest vacant capacity of its own mobile terminal is transmitted to the management server, at the time of the connection of an external instrument to an interface connector of its own mobile terminal.

According to a sixteenth aspect of the present invention, in the thirteenth aspect, the vacant capacity of its own mobile terminal is renewed by that the newest vacant capacity of its own mobile terminal is transmitted to the management server, at the time of the location registration of its own mobile terminal.

According to a seventeenth aspect of the present invention, for achieving the object mentioned above, there is provided a management program for memory capacity at a management apparatus for memory capacity that manages data capacity of mobile terminals that communicate with each other via a network, in which the data capacity of each of the mobile terminals is managed. The management program for memory capacity provides a judging step that judges whether data to be transmitted to each of the mobile terminals is transmitted to each of the mobile terminals or not, by comparing vacant capacity of each of the mobile terminals, which is managed by the management apparatus for memory capacity, with the amount of the data to be transmitted to each of the mobile terminals, an obtaining step that obtains some data storing in each of the mobile terminals and a storing step that stores the obtained data in the management apparatus for memory capacity, and a letting step that lets each of the mobile terminals make new vacant capacity when the data to be transmitted to each of the mobile terminals were judged not to be transmitted, and a transmitting step that transmits the data to be transmitted, which were judged not to be transmitted, to each of the mobile terminals by using the new vacant capacity.

According to an eighteenth aspect of the present invention, in the seventeenth aspect, the management program for memory capacity further provides a renewing step that renews the vacant capacity of each of the mobile terminals managing by the management apparatus for memory capacity and a managing step that manages the renewed vacant capacity by the management apparatus for memory capacity when each of the mobile terminals requests to obtain the data to be transmitted to each of the mobile terminals from the network.

According to a nineteenth aspect of the present invention, in the eighteenth aspect, the vacant capacity of each of the mobile terminals is renewed and managed by the management apparatus for memory capacity by receiving the information of the vacant capacity from each of the mobile terminals.

According to a twentieth aspect of the present invention, there is provided a management program for memory capacity at a management system for memory capacity, which provides mobile terminals that communicate with each other via a network and a management server that manages data capacity of each of the mobile terminals, in which the data capacity of each of the mobile terminals is managed. The management program for memory capacity provides a transmitting step that transmits a request for obtaining data from the network by each of the mobile terminals to the management server, a judging step that judges whether the data requested by each of the mobile terminals is transmitted to each of the mobile terminals or not, by comparing vacant capacity of each of the mobile terminals, which is managed by the management server, with the amount of the data requested by each of the mobile terminals, an obtaining step that obtains some data storing in each of the mobile terminals and a storing step that stores the obtained data in the management server, and a letting step that lets each of the mobile terminals make new vacant capacity when the data requested by each of the mobile terminals were judged not to be transmitted, and a transmitting step that transmits the data requested by each of the mobile terminals, which were judged not to be transmitted, to each of the mobile terminals by using the new vacant capacity.

According to a twenty-first aspect of the present invention, in the twentieth aspect, the management program for memory capacity further provides a renewing step that renews the vacant capacity managing by the management server by transmitting the newest vacant capacity of its own mobile terminal to the management server.

According to a twenty-second aspect of the present invention, in the twenty-first aspect, the vacant capacity of its own mobile terminal is renewed by that the newest vacant capacity of its own mobile terminal is transmitted to the management server, when the request for obtaining the data is transmitted to the management server.

According to a twenty-third aspect of the present invention, in the twenty-first aspect, the vacant capacity of its own mobile terminal is renewed by that the newest vacant capacity of its own mobile terminal is transmitted to the management server, at the time of the connection of an external instrument to an interface connector of its own mobile terminal.

According to a twenty-fourth aspect of the present invention, in the twenty-first aspect, the vacant capacity of its own mobile terminal is renewed by that the newest vacant capacity of its own mobile terminal is transmitted to the management server, at the time of the location registration of its own mobile terminal.

According to a twenty-fifth aspect of the present invention, there is provided a management system for memory capacity. The management system for memory capacity provides mobile terminals that communicate with each other via a network, and a management server that transmits data, which each of the mobile terminals requested to obtain from the network, to each of the mobile terminals. And each of the mobile terminals provides a data storing means that stores data obtained from the network. And the management server provides a data memorizing means that stores data from each of the mobile terminals, and a judging means that judges whether the data requested by each of the mobile terminals are stored in the data storing means of each of mobile terminals or not by managing vacant capacity of each of the mobile terminals. And when the judging means judged that the data requested by each of the mobile terminals were not stored in the data storing means, the management server obtains some data in the data storing means of each of the mobile terminals and stores the obtained data in the data memorizing means, and lets the data storing means make new vacant capacity, and the management server transmits the data requested by each of the mobile terminals, which were judged not to be stored, to each of the mobile terminals by using the new vacant capacity.

According to a twenty-sixth aspect of the present invention, there is provided a management system for memory capacity. The management system for memory capacity provides mobile terminals that communicate with each other via a network, and a management server that transmits data, which each of the mobile terminals requested to obtain from the network, to each of the mobile terminals. And each of the mobile terminals provides a data storing means that stores data obtained from the network, and a judging means that judges whether the data requested by each of the mobile terminals are stored in the data storing means or not by managing vacant capacity of each of the mobile terminals. And the management server provides a data memorizing means that stores data from each of the mobile terminals. And when the judging means judged that the data requested by each of the mobile terminals were not stored in the data storing means, the judging means makes the data memorizing means in the management server obtain some data in the data storing means of each of the mobile terminals, and lets the data storing means make new vacant capacity, and the judging means makes the management server transmit the data requested by each of the mobile terminals, which were judged not to be stored, to each of the mobile terminals by using the new vacant capacity.

According to a twenty-seventh aspect of the present invention, in the twenty-fifth aspect, each of the mobile terminals further provides a data capacity renewing means that makes the vacant capacity of each of the mobile terminals, which is managed by the management server, renew, by transmitting its own vacant capacity to the management server.

According to a twenty-eighth aspect of the present invention, in the twenty-seventh aspect, the data capacity renewing means transmits the vacant capacity of each of the mobile terminals to the management server and makes the vacant capacity of each of the mobile terminals renew at the time of the location registration of each of the mobile terminals.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
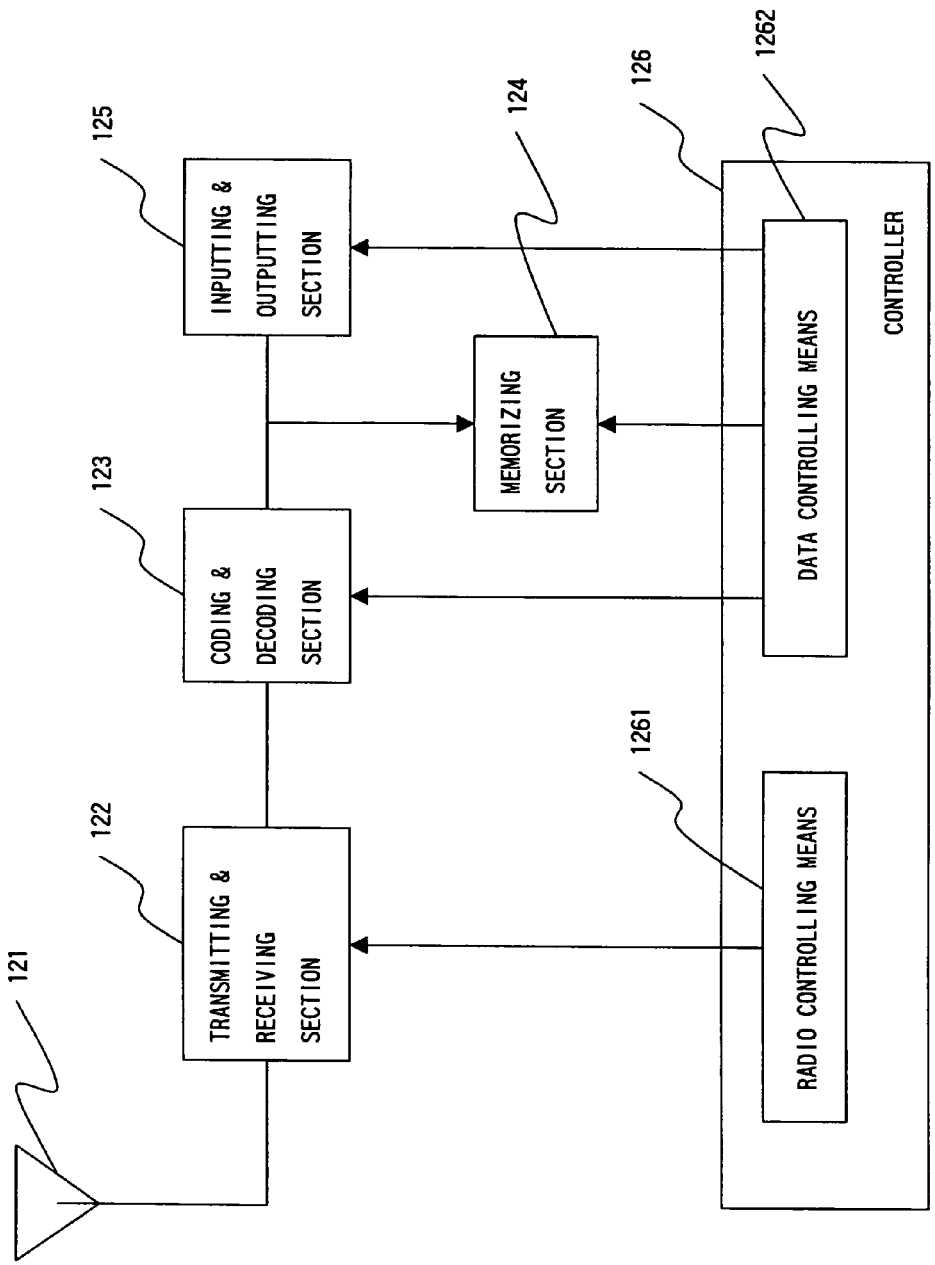
FIG. 1 is a block diagram showing the structure of a conventional mobile terminal.
Figure 2:
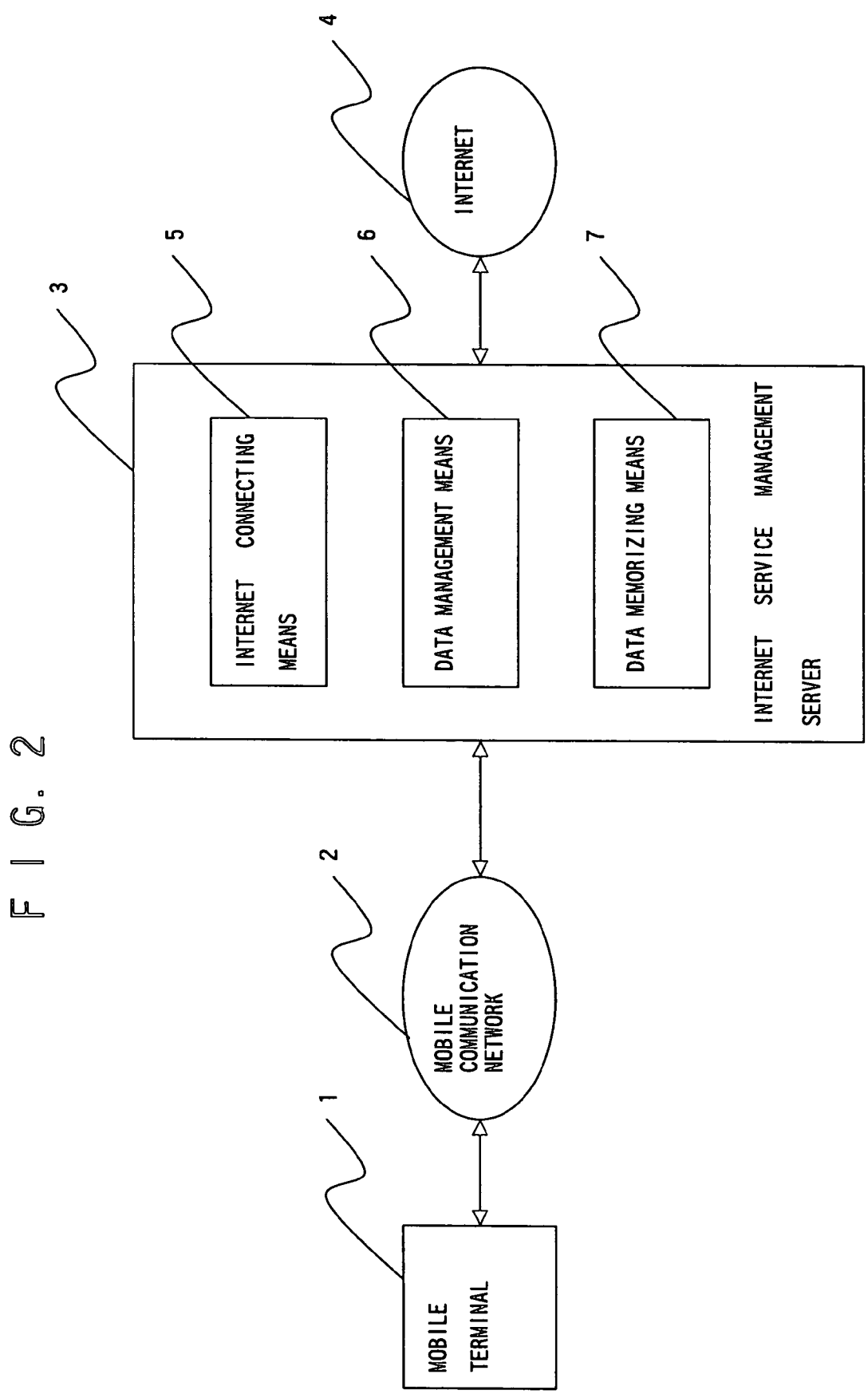
FIG. 2 is a block diagram showing the structure of a management system for memory capacity at a first embodiment of the present invention.

Referring now to the drawings, embodiments of the present invention are explained in detail. FIG. 2 is a block diagram showing the structure of a management system for memory capacity at a first embodiment of the present invention. Referring to FIG. 2, the structure of the management system for memory capacity at the first embodiment of the present invention is explained.

As shown in FIG. 2, the management system for memory capacity at the first embodiment of the present invention consists of a mobile terminal 1, a mobile communication network 2, an Internet service management server 3, and the Internet 4. In FIG. 2, one mobile terminal 1 is shown, however, actually, plural mobile terminals 1 are connected to the mobile communication network 2. In order to make the explanation concise, one mobile terminal 1 is used at the embodiments of the present invention. And as the mobile terminal 1, a mobile communication terminal such as a cellular phone or personal digital assistants (PDA), which can communicate with other communication instruments, can be used.

The mobile terminal 1 is connected to the Internet service management server 3 via the mobile communication network 2, and the Internet service management server 3 is connected to the Internet 4.

The Internet service management server 3 is a management apparatus for memory capacity of the present invention, and provides an Internet connecting means 5, a data management means 6, and a data memorizing means 7. The data management means 6 transfers data storing in the mobile terminal 1 to the data memorizing means 7 in the Internet service management server 3.

The mobile terminal 1 is connected to the Internet 4 by the Internet connecting means 5 in the Internet service management server 3 via the mobile communication network 2.

The data management means 6 compares the amount of data, which the mobile terminal 1 desires to obtains from the Internet 4, with the vacant capacity of the memory in the mobile terminal 1. And when the vacant capacity of the memory in the mobile terminal 1 is not sufficient for the amount of data obtaining from the Internet 4, the data management means 6 makes the data stored in the mobile terminal 1 to be transferred to the data memorizing means 7. With this, the data management means 6 makes the mobile terminal 1 secure the memory capacity for the data obtaining from the Internet 4. By the operation mentioned above, regardless of the current vacant capacity of the memory in the mobile terminal 1, the mobile terminal 1 can obtain the data from the Internet 4.

Figure 3:
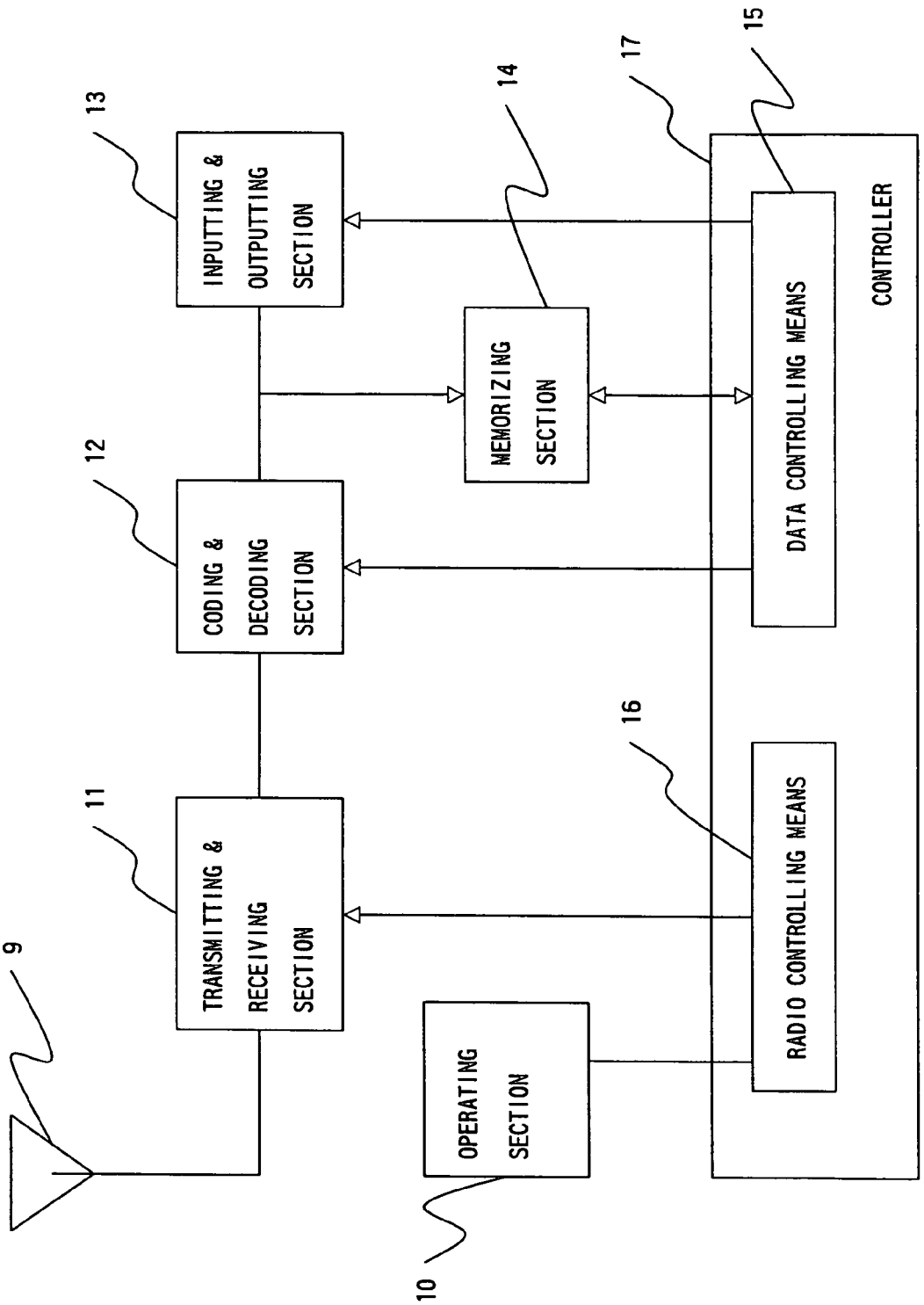
FIG. 3 is a block diagram showing the structure of a mobile terminal at the first embodiment of the present invention.

FIG. 3 is a block diagram showing the structure of the mobile terminal 1 at the first embodiment of the present invention. Referring to FIG. 3, the structure of the mobile terminal 1 at the first embodiment of the present invention is explained.

As shown in FIG. 3, the mobile terminal 1 at the first embodiment of the present invention provides an antenna 9, an operating section 10, a transmitting and receiving section 11, a coding and decoding section 12, an inputting and outputting section 13, a memorizing section 14, and a controller 17. The controller 17 provides a data controlling means 15 and a radio controlling means 16.

The antenna 9 and the transmitting and receiving section 11 execute the transmission and the reception of radio waves based on the communication system of the mobile terminal 1. The coding and decoding section 12 applies coding to the transmitting data and decoding to the received data. The memorizing section 14 stores the transmitting data and the received data. The inputting and outputting section 13 has interface functions with external instruments. The controller 17 controls much operation at the mobile terminal 1. The radio controlling means 16 controls the communication operation and the data controlling means 15 controls the operation except the operation executing by the radio controlling means 15.

The operating section 10 provides pushing buttons and/or a touch sensitive screen. By using the operating section 10, the user of the mobile terminal 1 transmits signals to the Internet service management server 3 and receives signals from the Internet service management server 3 via the mobile communication network 2.

The mobile communication network 2 is a network that connects the mobile terminal 1 to a destination mobile terminal, a destination telephone, or the Internet service management server 3.

The Internet service management server 3 is a server, which is managed by an Internet service provider, and provides the functions mentioned above. And as the Internet service management server 3, a PC or a work station can be used. In this case, the PC or the work station has the functions of the Internet service management server 3, and is connected to the Internet service provider, and the Internet service provider is connected to the Internet 4.

When the mobile terminal 1 requests to connect to the Internet 4, the Internet service management server 3 connects the mobile terminal 1 to the Internet 4 by using the Internet connecting means 5 via the mobile communication network 2.

That is, the mobile communication network 2 is a network that connects the mobile terminal 1 to another telephone including another mobile terminal and also connects the mobile terminal 1 to an Internet service provider including the Internet service management server 3.

And when the mobile terminal 1 simply desires to connect to the Internet 4, it is possible that the mobile terminal 1 connects to the Internet 4 via the mobile communication network 2 and an Internet service provider.

Figure 4:
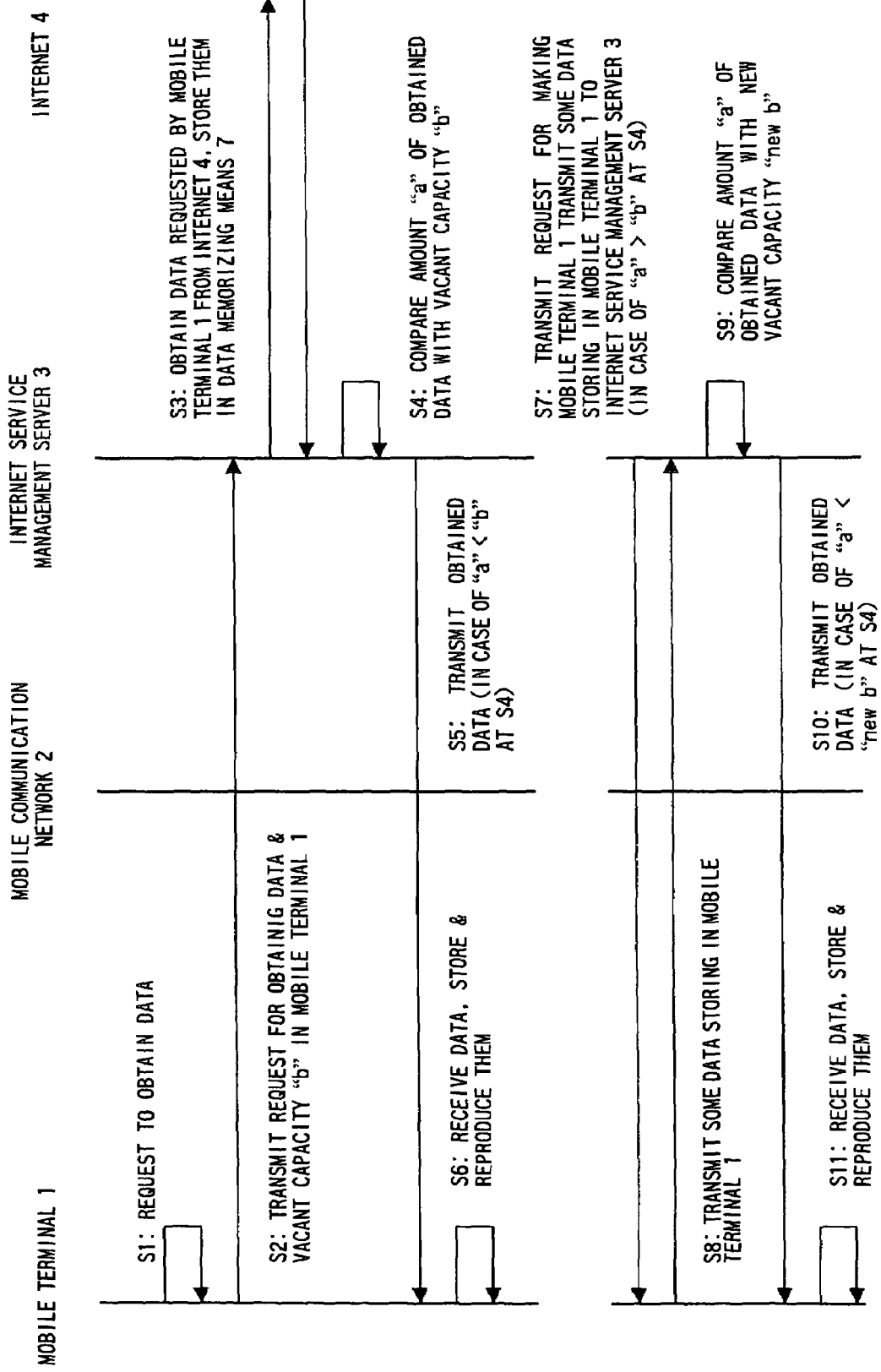
FIG. 4 is a sequence chart showing the operation of the management system for memory capacity at the first embodiment of the present invention.

FIG. 4 is a sequence chart showing the operation of the management system for memory capacity at the first embodiment of the present invention. Referring to FIG. 4, the operation of the management system for memory capacity at the first embodiment of the present invention is explained.

First, the user of the mobile terminal 1 requests to obtain some data via the Internet 4 by using the operating section 10 (step S1). In this, the data, which the user obtains via the Internet 4, are not limited to any specific data, and the data can be a large amount of data such as image data and sound data that can be obtained via the Internet 4.

Next, the mobile terminal 1 transmits the request for obtaining data and the vacant capacity "b" of the memorizing section 14 in the mobile terminal 1 to the Internet service management server 3 via the mobile communication network 2 (step S2). At this time, the protocol between the mobile terminal 1 and the mobile communication network 2, and the protocol between the mobile communication network 2 and the Internet service management server 3, are existing communications protocols.

The Internet service management server 3 obtains the data requested by the mobile terminal 1 from the Internet 4 and stores the obtained data in the data memorizing means 7 (step S3). The Internet service management server 3 compares the amount "a" of the obtained data with the vacant capacity "b" of the memorizing section 14 in the mobile terminal 1 (step S4). By this comparison, it is judged whether the obtained data can be stored in the vacant capacity of the memorizing section 14 in the mobile terminal 1.

When the amount "a" of the obtained data was less than the vacant capacity "b", that is, when it was judged that the data requested by the mobile terminal 1 were able to be stored in the memorizing section 14 (at the step S4, "a"<"b"), the Internet service management server 3 then transmits the obtained data to the mobile terminal 1 via the mobile communication network 2 (step S5).

The mobile terminal 1 receives the data requested by the mobile terminal 1 from the Internet service management server 3 and stores the received data in the memorizing section 14, and reproduces the contents of the received data (step S6).

When the amount "a" of the obtained data was more than the vacant capacity "b", that is, when it was judged that the data requested by the mobile terminal 1 were not able to be stored in the memorizing section 14 (at the step S4, "a">"b"), the Internet service management server 3 transmits a request, which makes some data stored in the memorizing section 14 to be transmitted to the Internet service management server 3, from the mobile terminal 1 (step S7). The mobile terminal 1 receives the request and transmits some data stored in the memorizing section 14 and the new vacant capacity "new b" of the memorizing section 14 to the Internet service management server 3, and makes the vacant capacity of the memorizing section 14 increase (step S8).

The Internet service management server 3 stores the data received from the mobile terminal 1 in the data memorizing means 7. The Internet service management server 3 compares the amount "a" of the obtained data with the new vacant capacity "new b" of the memorizing section 14 in the mobile terminal 1 (step S9).

When the amount "a" of the obtained data was less than the new vacant capacity "new b", that is, when it was judged that the data requested by the mobile terminal 1 were able to be stored in the memorizing section 14 (at the step S9, "a"<"new b"), the Internet service management server 3 then transmits the obtained data to the mobile terminal 1 via the mobile communication network 2 (step S10).

The mobile terminal 1 receives the data requested by the user from the Internet service management server 3 and stores the received data in the memorizing section 14, and reproduces the contents of the received data (step S11).

As mentioned above, when the mobile terminal 1 transmits the request for obtaining data on the Internet 4 to the Internet service management server 3, the information of the vacant capacity of the memorizing section 14 is also transmitted to the Internet service management server 3. By this operation, without asking the vacant capacity of the memorizing section 14 in the mobile terminal 1, the Internet service management server 3 can transmit the data requested by the user to the mobile terminal 1.

At the operation mentioned above, when the amount "a" of the obtained data were more than the vacant capacity "b" (at the step S 4, "a">"b"), the Internet service management server 3 transmitted a request, which makes the mobile terminal 1 transmit some data storing in the memorizing section 14 to the Internet service management server 3, to the mobile terminal 1 (at the step S7). At this time, in order to secure the vacant capacity of the memorizing section 14 for the obtained data, the mobile terminal 1 transmitted some data storing in the memorizing section 14. However, first, the difference ("a"-"b") between the amount "a" of the obtained data and the vacant capacity "b" of the memorizing section 14 is obtained. And the Internet service management server 3 transmits a request, which makes the mobile terminal 1 transmit some data storing in the memorizing section 14 whose amount is more than ("a"-"b"), to the mobile terminal 1 (at the step S7). And the mobile terminal 1 receives the request and transmits the data storing in the memorizing section 14 whose amount is more than ("a"-"b") to the Internet service management server 3 (at the step S8).

With the operation mentioned above, the mobile terminal 1 can obtain the vacant capacity for the data requested by the user by transmitting the data storing in the mobile terminal 1 to the Internet service management server 3 by only once transmission.

Figure 5:
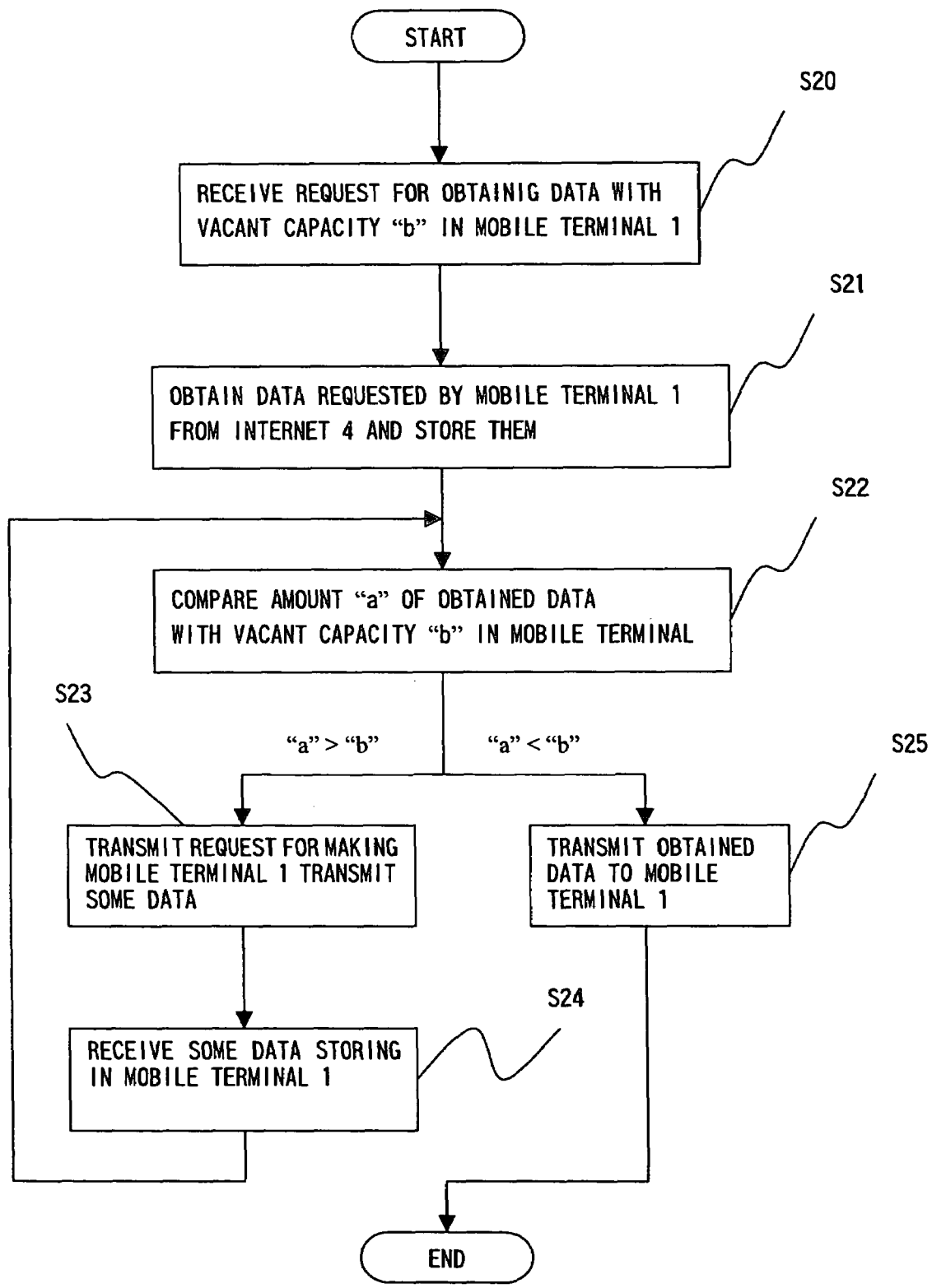
FIG. 5 is a flowchart showing the operation of an Internet service management server at the first embodiment of the present invention.

FIG. 5 is a flowchart showing the operation of the Internet service management server 3 at the first embodiment of the present invention. Referring to FIG. 5, the operation of the Internet service management server 3 at the first embodiment of the present invention is explained in detail.

First, the Internet service management server 3 receives a request for obtaining data on the Internet 4 from the mobile terminal 1 via the mobile communication network 2 with the vacant capacity "b" of the memorizing section 14 in the mobile terminal 1 (step S20).

The Internet service management server 3 obtains the data requested by the mobile terminal 1 from the Internet 4 and stores the obtained data in the data memorizing means 7 (step S21).

The Internet service management server 3 compares the amount "a" of the obtained data with the vacant capacity "b" of the memorizing section 14 in the mobile terminal 1. And the Internet service management server 3 judges whether the obtained data can be stored in the vacant capacity of the memorizing section 14 in the mobile terminal 1 or not (step S22).

When it was judged that the obtained data were not able to be stored in the memorizing section 14 (at the step S22, "a">"b"), the Internet service management server 3 transmits a request, which makes some data storing in the memorizing section 14 transmit to the Internet service management server 3, to the mobile terminal 1 (step S23). And the Internet service management server 3 receives a part of the data or all of the data storing in the memorizing section 14 in the mobile terminal 1 (step S24).

When it was judged that the obtained data were able to be stored in the memorizing section 14 (at the step S22, "a"<"b"), the Internet service management server 3 transmits the obtained data to the mobile terminal 1 via the mobile communication network 2 (step S25).

By the operation mentioned above, the mobile terminal 1 can receive the data obtained by the Internet service management server 3 and can store them in the memorizing section 14.

As mentioned above, the Internet service management server 3 compares the amount "a" of the data obtained from the Internet 4 by the request for obtaining data from the mobile terminal 1 with the vacant capacity "b" of the memorizing section 14 in the mobile terminal 1. And the Internet service management server 3 judges whether the mobile terminal 1 can receive the data obtained by the Internet service management server 3.

When it was judged that the obtained data were not able to be stored in the memorizing section 14 ("a">"b"), the Internet service management server 3 receives some data storing in the memorizing section 14 in the mobile terminal 1. With this, the vacant capacity of the memorizing section 14 in the mobile terminal 1 can be secured and the Internet service management server 3 transmits the data, which were requested by the mobile terminal 1, to the mobile terminal 1.

Therefore, the mobile terminal 1 can obtain various data regardless of the current vacant capacity of the memorizing section 14.

Figure 6:
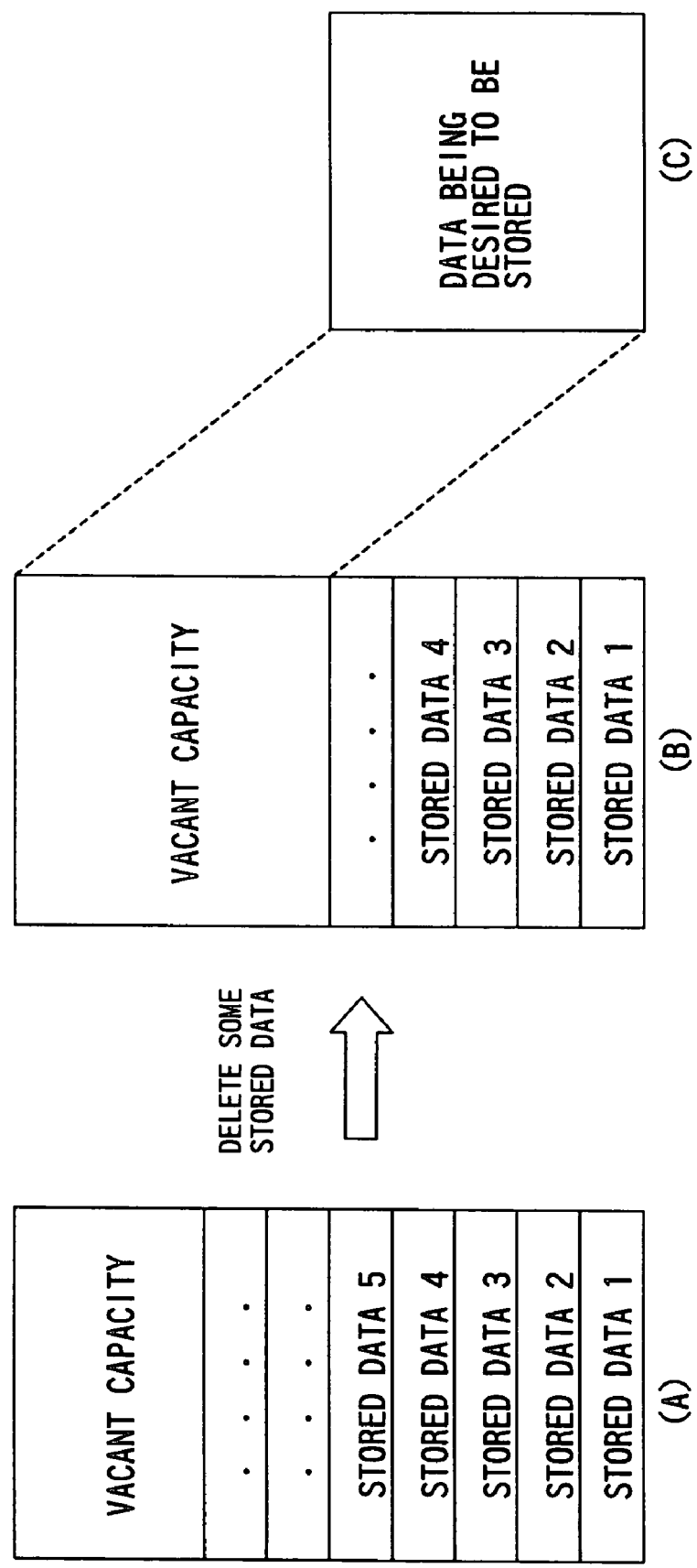
FIG. 6 is a diagram showing an example of data storing states in a data memorizing means in the Internet service management server shown in FIG. 2.

FIG. 6 is a diagram showing an example of data storing states in the data memorizing means 7 of the Internet service management server 3 shown in FIG. 2. In FIG. 6, (A) shows a state that the vacant capacity is not sufficient for data to be stored newly, (B) shows a state that the vacant capacity was secured for the data to be stored newly, and (C) shows the data that are desired to be stored.

Referring to FIG. 6, the method to secure the vacant capacity for the data being desired to be stored in the data memorizing means 7 is explained. At the operation mentioned above, as shown in FIG. 6. (A), when the data memorizing means 7 was not able to secure the vacant capacity for the data requested by the mobile terminal 1, the data management means 6 instructs the mobile terminal 1 to execute the following operation. That is, the data management means 6 instructs the mobile terminal 1 to delete some data storing in the data memorizing means 7 or to stop storing the data requested by the mobile terminal 1. By the operation mentioned above, the user of the mobile terminal 1 can select some data that are stored in the data memorizing means 7 in the Internet service management server 3. That is, the user of the mobile terminal 1 can select some data to be deleted in the data memorizing means 7.

As the method selecting data to be deleted by the instruction of the mobile terminal 1, there are several methods such as selecting some data by the amount of data, selecting some old data by the order of storing date, and selecting the data being not used frequently. By deleting some data from the data storing in the data memorizing means 7 shown in FIG. 6(A), as shown in FIG. 6(B), the vacant capacity for the data being desired to be stored shown in FIG. 6(C), which the Internet service management server 3 obtained, can be secured in the data memorizing means 7.

Next, a data management method at the Internet service management server 3 is explained. At the data management method, the Internet service management server 3 of the Internet service provider, which the user of the mobile terminal 1 has contracted with, is used as an external storage. And the amount of data, which exceeded the capacity of the memorizing section 14 in the mobile terminal 1, is managed by the Internet service management server 3. By this method, the mobile terminal 1 can obtain a large amount of data without considering the current vacant capacity of the memorizing section 14.

Figure 7:
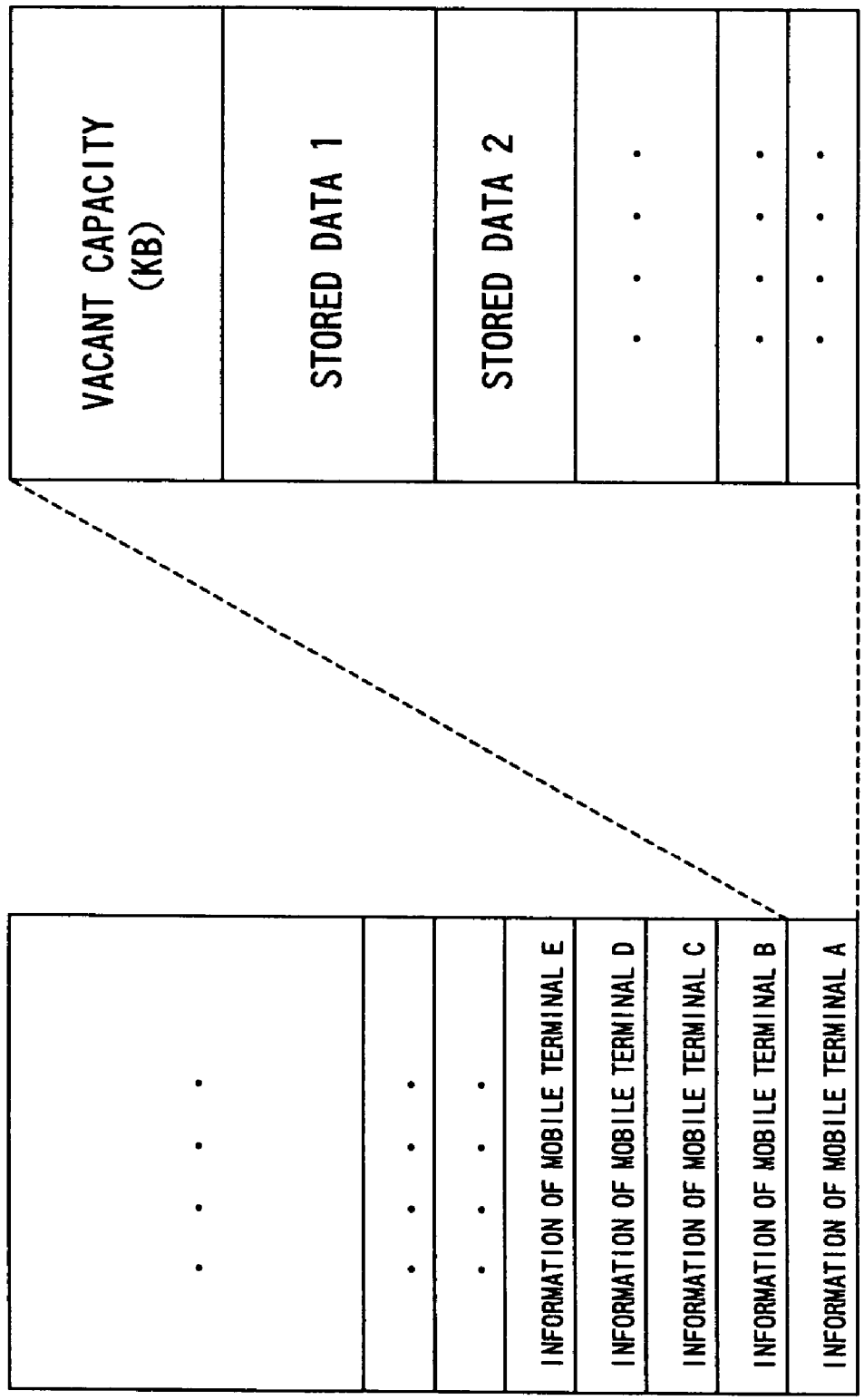
FIG. 7 is a diagram showing an example of data storing in the data memorizing means of the Internet service management server shown in FIG. 2.

FIG. 7 is a diagram showing an example of data storing in the data memorizing means 7 of the Internet service management server 3 shown in FIG. 2. Referring to FIG. 7, the data management method is explained.

As mentioned above, the Internet service management server 3 provides the data management means 6 and the data memorizing means 7, and manages the information of the mobile terminal 1. As shown in FIG. 7, the information of plural mobile terminals 1 has been stored in the data memorizing means 7. In FIG. 7, the information of the mobile terminals A to E has been stored. Further, as shown in FIG. 7, the vacant capacity of the memorizing section 14, and plural data 1, 2, . . . , which have been transmitted from the mobile terminal 1, have been stored every mobile terminals A to E in the data memorizing means 7.

Since the vacant capacity of the memorizing section 14 in the mobile terminal 1 has been transmitted to the Internet service management server 3 at the time when the mobile terminal 1 requested for obtaining some data from the Internet 4, the data management means 6 can obtain the information of the vacant capacity by referring to the storing data in the data memorizing means 7.

In order to make the operation simple between the mobile terminal 1 and the Internet service management server 3, it is desirable that the information of the vacant capacity of the memorizing section 14 in the mobile terminal 1 is managed by the side of the Internet service management server 3.

At the operation mentioned above, the vacant capacity of the memorizing section 14 in the mobile terminal 1 is transmitted to the Internet service management server 3 at the time when the mobile terminal 1 requests for obtaining some data from the Internet 4. However, it is desirable for the Internet service management server 3 to obtain the information of the vacant capacity of the memorizing section 14 in the mobile terminal 1, before the mobile terminal 1 requests to obtain some data from the Internet 4. Because, the vacant capacity of the memorizing section 14 in the mobile terminal 1 always changes, and in case that the information of the current vacant capacity is not obtained before the mobile terminal 1 requests to obtain some data from the Internet 4, the Internet service management server 3 cannot compare the amount of obtaining data with the current vacant capacity.

Therefore, it is desirable that the Internet service management server 3 always manages the information of the vacant capacity of the memorizing section 14 in the mobile terminal 1 and renews it.

Next, two methods, which the Internet service management server 3 renews the information of the vacant capacity of the memorizing section 14 in the mobile terminal 1, are explained.

At the first method, the mobile terminal 1 transmits the information of the vacant capacity of the memorizing section 14 to the Internet service management server 3 at the time when an external instrument was connected to or was disconnected from an interface connector provided in the mobile terminal 1. With this method, every time when the vacant capacity of the memorizing section 14 in the mobile terminal 1 changed, the information of the vacant capacity is transmitted to the Internet service management server 3, and the management information of the mobile terminal 1 in the data memorizing means 7 is renewed. In this case, the mobile terminal 1 provides an interface connector(s) for an external instrument(s) such as a PC and a memory card.

At the second method, the mobile terminal 1 transmits the information of the vacant capacity of the memorizing section 14 to the Internet service management server 3 at the time when the mobile terminal 1 registered the location of the mobile terminal 1. With this method, every time when the information of the location of the mobile terminal 1 is transmitted, the vacant capacity of the memorizing section 14 in the mobile terminal 1 is also transmitted to the Internet service management server 3, and the management information of the mobile terminal 1 in the data memorizing means 7 is renewed.

Figure 8:
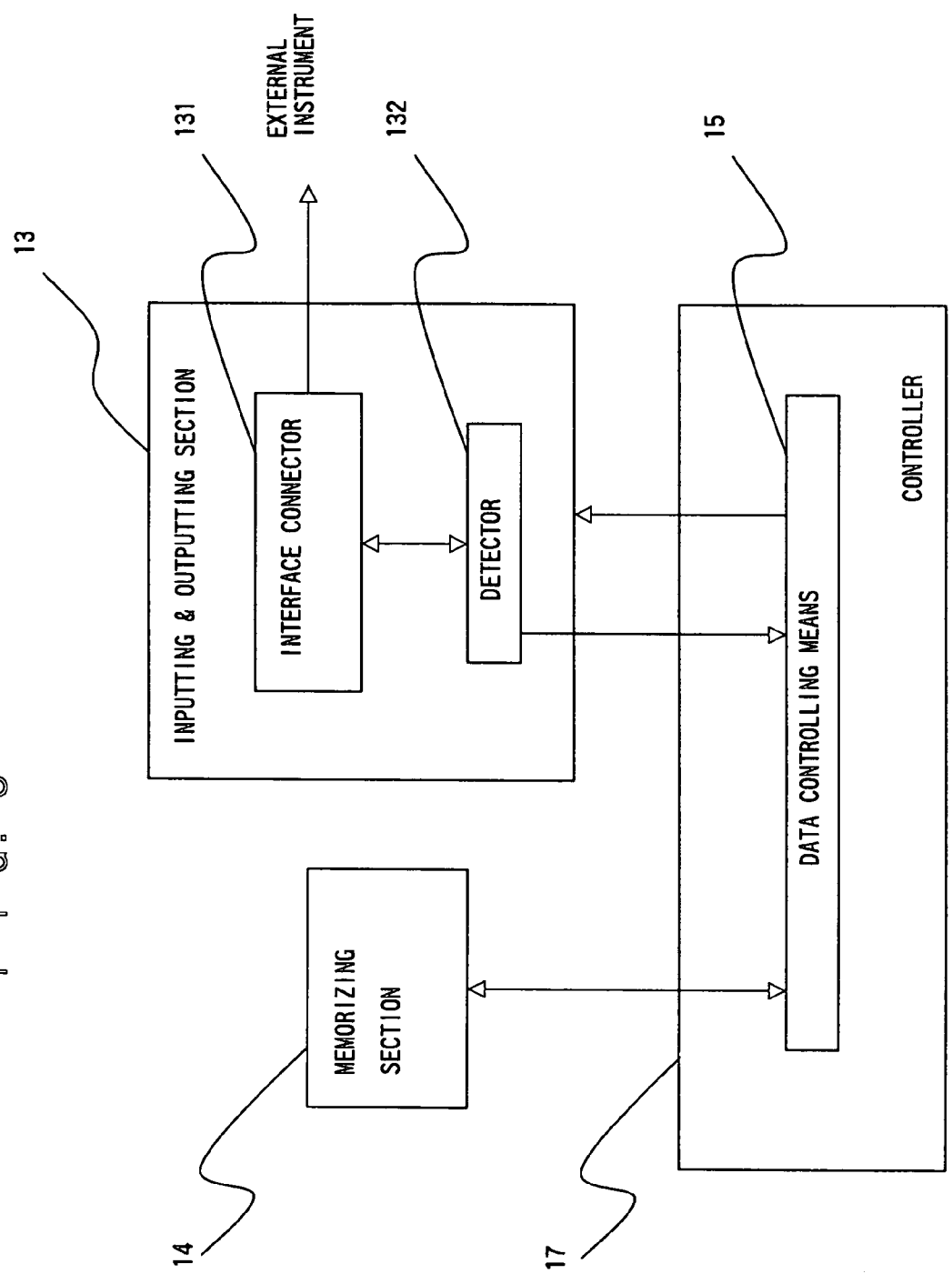
FIG. 8 is a block diagram showing the structure of an inputting and outputting section in the mobile terminal shown in FIG. 3.

The first method using the interface connector is explained in detail. FIG. 8 is a block diagram showing the structure of the inputting and outputting section 13 in the mobile terminal 1 shown in FIG. 3. As shown in FIG. 8, the inputting and outputting section 13 in the mobile terminal 1 provides an interface connector 131 and a detector 132. The interface connector 131 is a connector adopting the standard such as the USB and the RS-232C or a specific interface connector, and is connected to an external instrument. The detector 132 detects whether the interface connector 131 was connected to or disconnected from the external instrument. For example, the detector 132 applies a voltage to a specific terminal of the interface connector 131, and a terminal to the external instrument of the interface connector 131 is grounded. In this example, when the external instrument was not connected to the interface connector 131, the voltage is detected, and when the external instrument was connected to the interface connector 131, the voltage is not detected. Therefore, the states, whether the external instrument was connected to or disconnected from the interface connector 131, can be detected.

Figure 9:
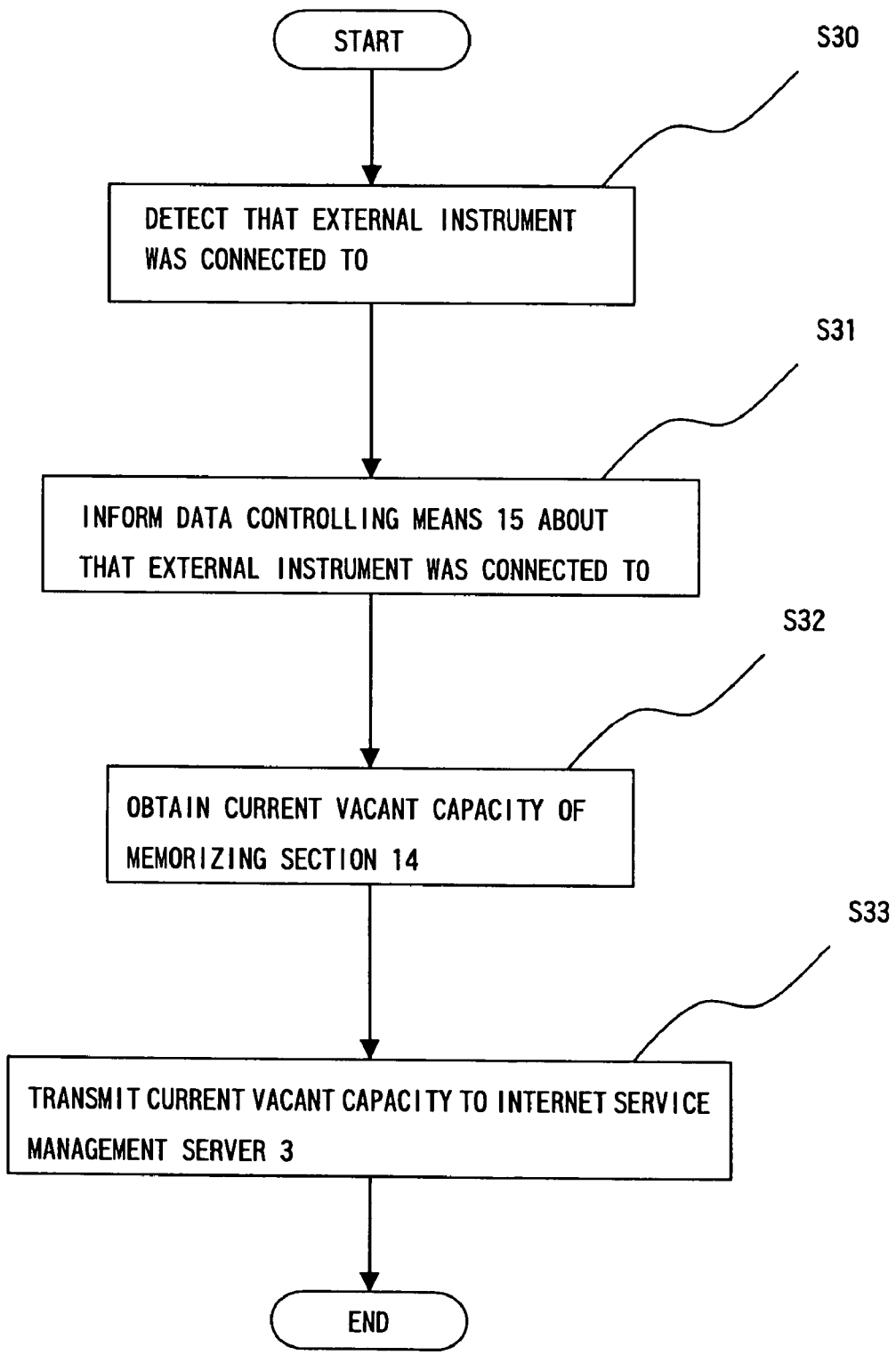
FIG. 9 is a flowchart showing the operation transmitting current vacant capacity of a memorizing section to the Internet service management server by detecting that an external instrument was connected to the mobile terminal at the first embodiment of the present invention.

FIG. 9 is a flowchart showing the operation transmitting the current vacant capacity of the memorizing section 14 to the Internet service management server 3 by detecting that an external instrument was connected to the mobile terminal 1 at the first embodiment of the present invention. Referring to FIG. 9, this operation is explained.

When an external instrument was connected to the interface connector 131, the detector 132 detects this connection (step S30). The detector 132 informs the data controlling means 15 about that the external instrument was connected to the interface connector 131 (step S31). The data controlling means 15 obtains the current vacant capacity of the memorizing section 14 (step S32). And the data controlling means 15 transmits the current vacant capacity to the Internet service management server 3 via the inputting and outputting section 13 (step S33).

As mentioned above, by detecting whether the external instrument was connected to the interface connector 131 or not, the current vacant capacity of the memorizing section 14 in the mobile terminal 1 can be transmitted to the Internet service management server 3. And the vacant capacity of the mobile terminal 1 storing in the data memorizing means 7 can be renewed.

At the explanation mentioned above, a case that the external instrument was connected to the interface connector 131 was explained. However, another case that the external instrument was disconnected from the interface connector 131 can be used. Or, the difference of the vacant capacity of the memorizing section 14 between at the time of connection and at the time of disconnection is calculated, and this difference is transmitted to the Internet service management server 3. This is also possible.

Next, the second method using the location registration time of the mobile terminal 1 is explained in detail. Each of base stations has a location area, and transmits a radio signal in the location area. The mobile terminal 1 knows the location area by receiving the radio signal from the base station. Therefore, when the mobile terminal 1 moves from a location area to a different location area, the mobile terminal 1 knows the change of the location area. The mobile terminal 1 transmits a request for location registration including the telephone number of the mobile terminal 1 to the base station.

At the second method, the mobile terminal 1 transmits the information of the vacant capacity of the memorizing section 14 to the Internet service management server 3 by using the time of the location registration of the mobile terminal 1.

Figure 10:
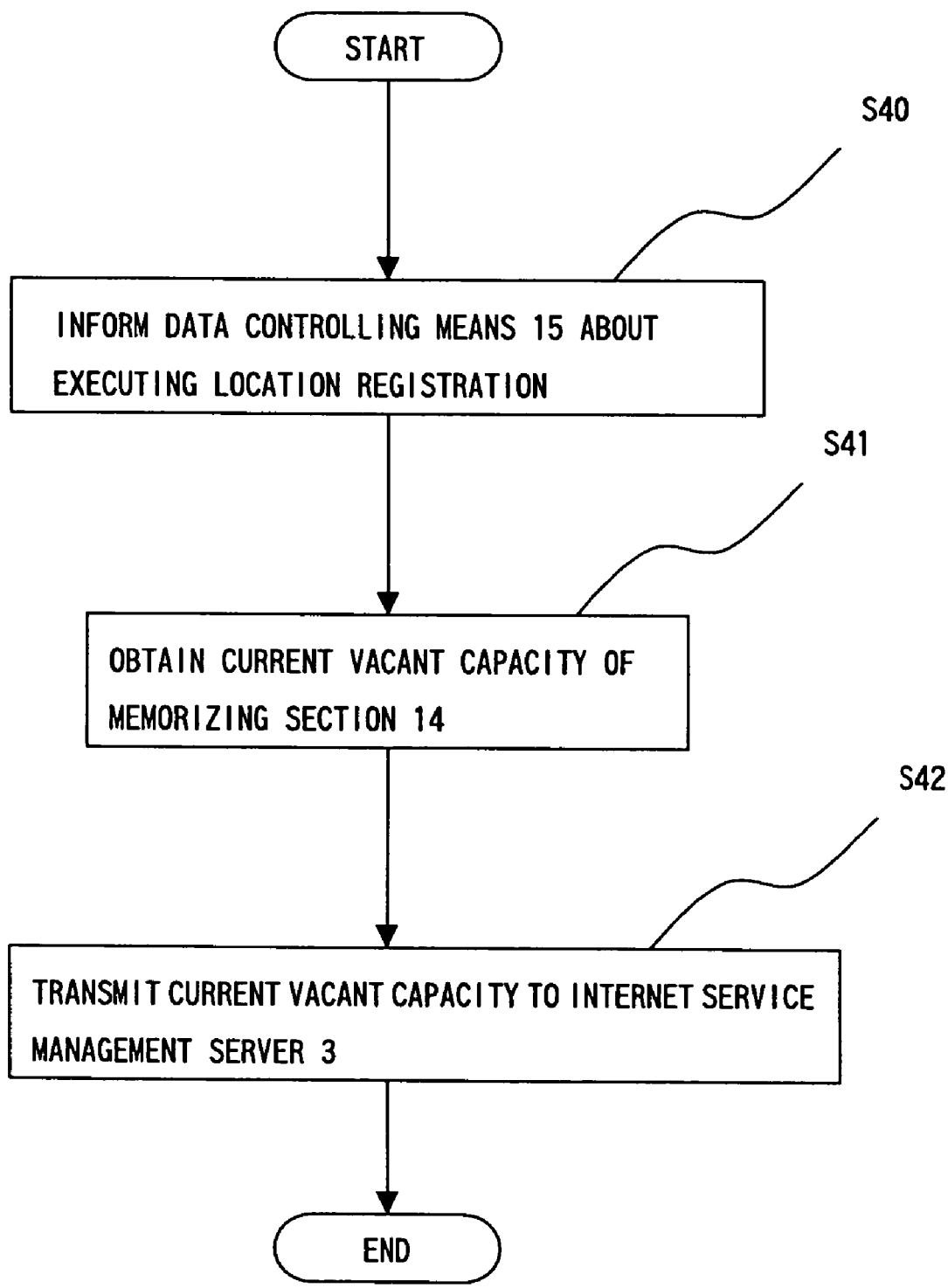
FIG. 10 is a flowchart showing the operation transmitting current vacant capacity of the memorizing section to the Internet service management server at the time of the location registration of the mobile terminal at the first embodiment of the present invention.

FIG. 10 is a flowchart showing the operation transmitting current vacant capacity of the memorizing section 14 to the Internet service management server 3 at the time of the location registration of the mobile terminal 1 at the first embodiment of the present invention. Referring to FIG. 10, this operation is explained.

First, the radio controlling means 16 in the mobile terminal 1 informs the data controlling means 15 about executing the location registration (step S40). The data controlling means 15 obtains the current vacant capacity of the memorizing section 14 at the time of the location registration (step S41). The data controlling means 15 transmits the obtained current vacant capacity to the Internet service management server 3 via the inputting and outputting section 13 (step S42).

As mentioned above, at the same time when the mobile terminal 1 executes the location registration, the mobile terminal 1 transmits the current vacant capacity of the memorizing section 14 in the mobile terminal 1 to the Internet service management server 3. By this operation, the Internet service management server 3 obtains the information of the vacant capacity of each of the mobile terminals. With this, the Internet service management server 3 can manage the vacant capacity of each of the mobile terminals.

Between the mobile terminal 1 and the base station, radio signals are transmitted and received via communication channels. Since the mobile terminal 1 always moves, the location information of the mobile terminal 1 is important. At the mobile communication network 2, the location information is managed by the paging area (PA) unit in the home location register (HLR). The HLR is a database in which the information such as the location information, the subscriber information, and the authentication information is registered. The PA is the location information of the mobile terminals, which is recorded by the mobile communication network 2.

Figure 11:
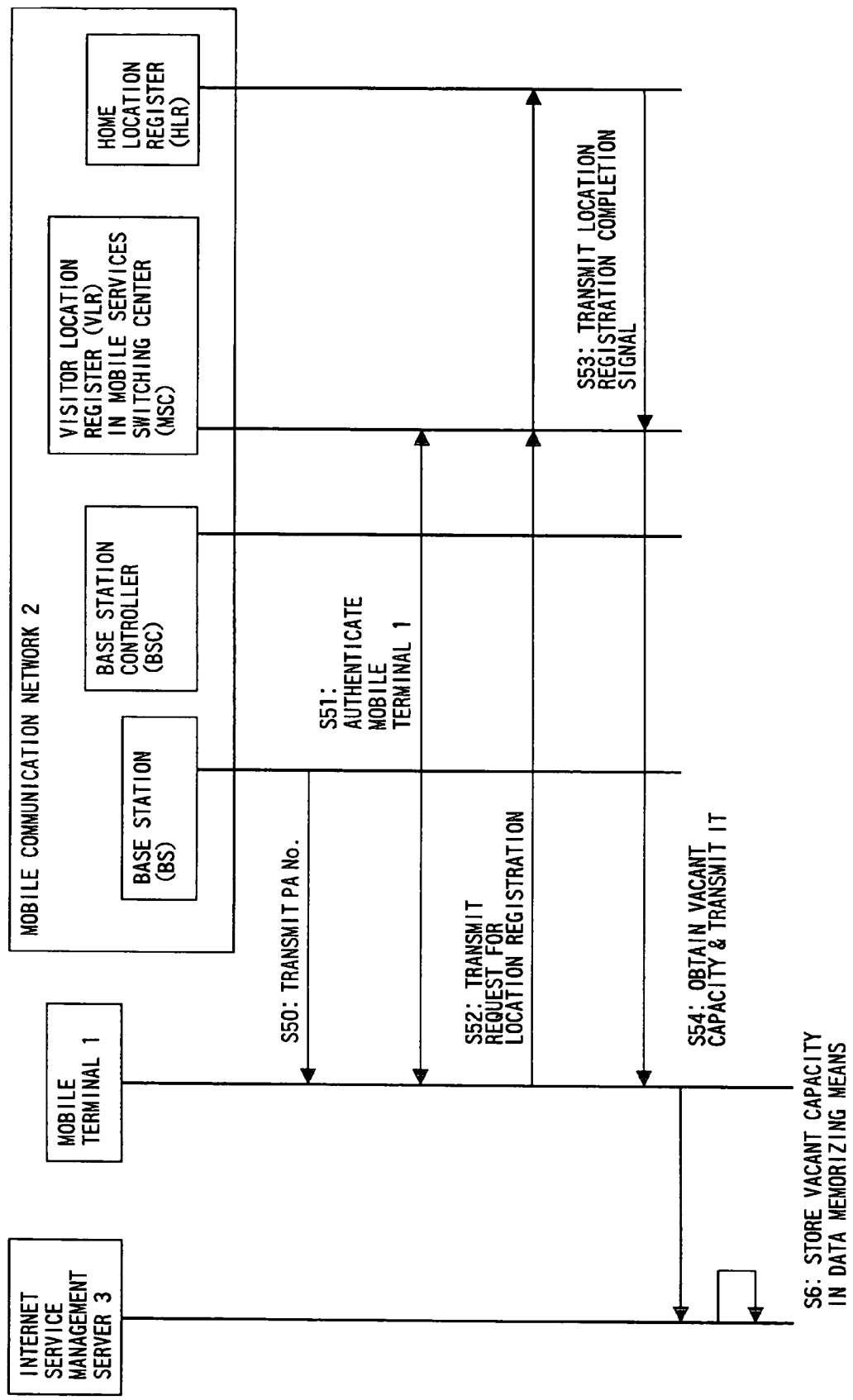
FIG. 11 is a sequence chart showing the operation transmitting the vacant capacity of the memorizing section to the Internet service management server at the time of the location registration of the mobile terminal at the first embodiment of the present invention.

FIG. 11 is a sequence chart showing the operation transmitting the vacant capacity of the memorizing section 14 to the Internet service management server 3 at the time of the location registration of the mobile terminal 1 at the first embodiment of the present invention. Referring to FIG. 11, the operation transmitting the vacant capacity is explained.

At the mobile communication network 2, the PA number showing the location is always transmitted from the base station by using a broadcasting control channel, which all the mobile terminals can receive. Therefore, first, the base station transmits the PA number to the mobile terminal 1 (step S50). The mobile terminal 1 memorizes the PA number by receiving the PA number from the base station.

The mobile terminal 1 starts up the location registration when the receiving PA number is changed. And the mobile terminal 1 is authenticated (step S51). At this authentication, first, the mobile communication network 2 transmits a random number to the mobile terminal 1. The mobile terminal 1 returns the result (response), calculated by a formula being specific to the mobile terminal 1 by using the received random number (challenge), to the mobile communication network 2. The mobile communication network 2 also has the result, calculated by the formula being specific to the mobile terminal 1, in the visitor location register (VLR) of the mobile services switching center (MSC). And when the result returned from the mobile terminal 1 is matched with the result in the VLR, the mobile terminal 1 is authenticated.

When the mobile terminal 1 was authenticated by the change and response, the mobile terminal 1 transmits a request for the location registration to the HLR (step S52). The HLR rewrites the location information of the mobile terminal 1 by receiving the request.

When the location registration for the mobile terminal 1 was completed, the HLR transmits a location registration completion signal to the mobile terminal 1 (step S53). When the mobile terminal 1 received the location registration completion signal from the HLR, the mobile terminal 1 obtains the vacant capacity of the memorizing section 14, and transmits the vacant capacity to the Internet service management server 3 (step S54).

The Internet service management server 3 stores the information of the vacant capacity received from the mobile terminal 1 in the data memorizing means 7. And the Internet service management server 3 manages the vacant capacity by using the data management means 6. With this, the vacant capacity of the mobile terminal 1 can be managed at the Internet service management server 3 (step S55).

The operation transmitting and managing the vacant capacity of the mobile terminal 1 was explained. However, there are two additional methods except the ones mentioned above.

As the first method, when the user turned on the power supply of the mobile terminal 1, the mobile terminal 1 transmits the vacant capacity to the Internet service management server 3. As the second method, the time, when the vacant capacity is transmitted to the Internet service management server 3, is set beforehand, and the vacant capacity is transmitted to the Internet service management server 3 periodically.

As mentioned above, the vacant capacity of the memorizing section 14 in the mobile terminal 1 is managed in the Internet service management server 3. With this, when the Internet service management server 3 received a request for obtaining some data on the Internet 4 from the mobile terminal 1, the Internet service management server 3 does not inquire the vacant capacity of the mobile terminal 1. And the Internet service management server 3 compares the amount of data requested by the user with the vacant capacity of the mobile terminal 1.

By the operation mentioned above, the process inquiring the vacant capacity of the memorizing section 14 in the mobile terminal 1 from the Internet service management server 3 to the mobile terminal 1 can be eliminated, and the mobile terminal can obtain the data desired by the user surely and quickly from the Internet 4 via the Internet service management server 3.

Next, a second embodiment of the present invention is explained. At the second embodiment of the present invention, the data management of the mobile terminal 1 is executed at the data controlling means 15 in the mobile terminal 1, instead of executing at the data management means 6 in the Internet service management server 3. The structure of the management system for memory capacity is the same that at the first embodiment.

Figure 12:
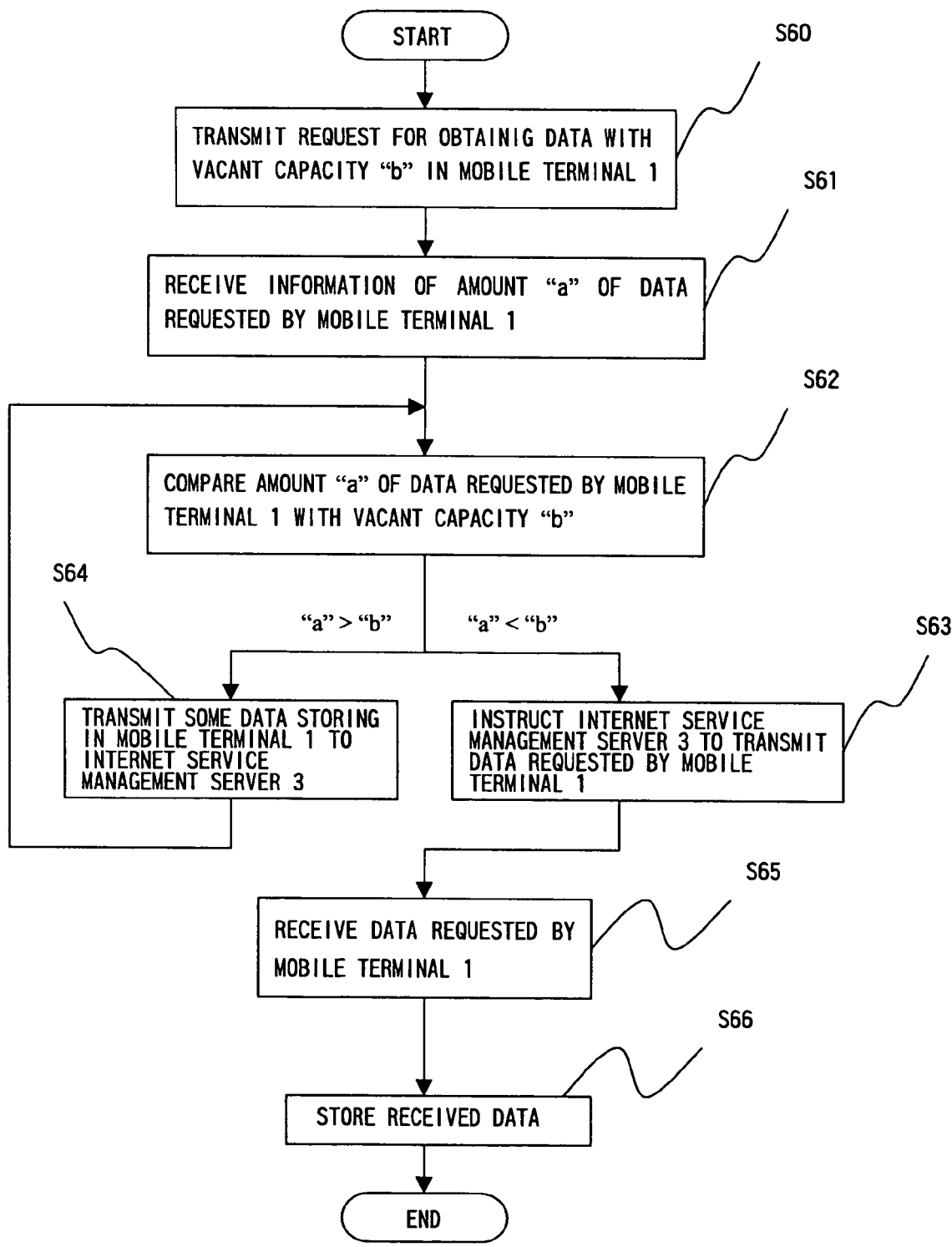
FIG. 12 is a flowchart showing the data management operation at the mobile terminal at a second embodiment of the present invention.

FIG. 12 is a flowchart showing the data management operation at the mobile terminal 1 at the second embodiment of the present invention. Referring to FIG. 12, this operation is explained.

First, the user of the mobile terminal 1 sets a request for obtaining some data from the Internet 4 by using the operating section 10. And the mobile terminal 1 transmits the request with the vacant capacity "b" of the memorizing section 14 to the Internet service management server 3 via the mobile communication network 2 (step S60). The mobile terminal 1 receives the information of the amount "a" of the data requested by the user from the Internet service management server 3 (step S61).

The data controlling means 15 in the mobile terminal 1 compares the amount "a" of the data requested by the user with the vacant capacity "b" of the memorizing section 14 in the mobile terminal 1. And the data controlling means 15 judges whether the data requested by the user can be stored in the vacant capacity "b" of the memorizing section 14 in the mobile terminal 1 or not (step S62).

When it was judged that the data requested by the user were able to be stored in the memorizing section 14 (at the step S62, "a"<"b"), the mobile terminal 1 instructs the Internet service management server 3 to transmit the data requested by the user to the mobile terminal 1 via the mobile communication network 2 (step S63).

When it was judged that the data requested by the user were not able to be stored in the memorizing section 14 (at the step S62, "a">"b"), the data controlling means 15 in the mobile terminal 1 transmits some data storing in the memorizing section 14 to the Internet service management server 3 via the mobile communication network 2 (step S64).

After the step S63, the mobile terminal 1 receives the data requested by the user from the Internet service management server 3 (step S65). And the mobile terminal 1 stores the received data in the memorizing section 14 in the mobile terminal 1 (step S66).

As mentioned above, at the second embodiment of the present invention, the mobile terminal 1 manages the vacant capacity of the memorizing section 14 by the data controlling means 15. And when the vacant capacity of the memorizing section 14 is not sufficient for storing the data requested by the user, the mobile terminal 1 makes the Internet service management server 3 store some data storing in the memorizing section 14. With this, without deleting some data storing in the mobile terminal 1, the vacant capacity of the memorizing section 14 can be secured.

As mentioned above, according to the embodiments of the present invention, several effects can be obtained. First, the data storing ability of the mobile terminal becomes high. Because, when the user of the mobile terminal desired to obtain some data whose amount was more than the vacant capacity of the memory in the mobile terminal, the data controlling means in the mobile terminal transfers some data storing in the mobile terminal to the Internet service management server, and makes sufficient capacity for the data that the user desired. And the mobile terminal stores the data desired by the user. Therefore, it is not necessary that the user cares about the current vacant capacity in the mobile terminal, and the usability of the mobile terminal becomes high.

Second, the Internet service management server manages the memory capacity of the mobile terminals. Therefore, when the mobile terminal required to obtain some data from the Internet, the Internet service management server can manage the vacant capacity in the mobile terminal without inquiring the vacant capacity in the mobile terminal. With this, the mobile terminal can obtain some data that user desired to obtain surely and quickly from the Internet via the Internet service management server.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A management apparatus for managing memory capacity, comprising:
    a data capacity management means that manages data capacity of remote mobile terminals that communicate with each other via a network;
    a transmission judging means that judges, in response to a request for data from said network and a vacant storage capacity of a memory issued from a remote mobile terminal, whether said requested data is to be transmitted to said remote mobile terminal by comparing said vacant storage capacity of said remote mobile terminal, which is managed by said data capacity management means, with the amount of said data to be transmitted to said remote mobile terminal; and
    a transmitting means that obtains some data for storing in said remote mobile terminal and stores said obtained data and causes said remote mobile terminal to make a new vacant storage capacity when said data to be transmitted were judged not to be transmitted, and transmits said data to be transmitted, which were judged not to be transmitted, to said remote mobile terminal by using said new vacant storage capacity.

2. A management apparatus for managing memory capacity in accordance with claim 1, wherein, said data capacity management means renews said vacant capacity of said remote mobile terminals, when said remote mobile terminals requests to obtain some data from said network, and manages said renewed vacant capacity.

3. A management apparatus for managing memory capacity in accordance with claim 2, wherein, said data capacity management means renews said vacant capacity of each of said remote mobile terminals by receiving the information of said vacant capacity from each of said remote mobile terminals and manages said renewed vacant capacity.

4. A management system for managing memory capacity, comprising:
    a plurality of remote mobile terminals that communicate with each other via a network; and
    a management server including a data memorizing means that stores data from said plurality of remote mobile terminals, wherein:
    said remote mobile terminals, comprising:
        a data obtaining request transmitting means that transmits a request for obtaining data from said network to said management server, and
    said management server, comprising:

a data capacity management means that manages data capacity of said remote mobile terminals;

a transmission judging means that judges, in response to a request for data from said network and a vacant storage capacity of a memory issued from a remote mobile terminal, whether said data requested by each of at least one of said remote mobile terminals is transmitted to each of said at least one of said remote mobile terminals, by comparing said vacant storage capacity of each of said at least one of said remote mobile terminals, which is managed by said data capacity management means, with the amount of said data requested by said data obtaining request transmitting means; and a transmitting means that obtains some data for storing in each of said at least one of said remote mobile terminals and stores said obtained data in said data memorizing means and causes each of said at least one of said remote mobile terminals to make a new vacant storage capacity when said data requested by each of said at least one of said remote mobile terminals were judged not to be transmitted, and transmits said data requested by each of said at least one of said remote mobile terminals, which were judged not to be transmitted, to each of said at least one of said remote mobile terminals by using said new vacant storage capacity.

5. A management system for managing memory capacity in accordance with claim 4, wherein said remote mobile terminals, further comprises;

a data capacity renewing means that transmits the newest vacant capacity of said at least one of said remote mobile terminals to said management server, and makes said vacant capacity managing by said data capacity management means in said management server renew.

6. A management system for managing memory capacity in accordance with claim 5, wherein said data capacity renewing means transmits the newest vacant capacity of said at least one of said remote, mobile terminals to said management server, and makes said vacant capacity managing by said data capacity management means in said management server renew, when said data obtaining request transmitting means transmits said request for obtaining data from said network to said management server.

7. A management system for managing memory capacity in accordance with claim 5, wherein said data capacity renewing means transmits the newest vacant capacity of said at least one of said remote mobile terminals to said management server, and makes said vacant capacity managing by said data capacity management means in said management server renew, at the time of the connection of an external instrument to an interface connector of said at least one of said remote mobile terminals.

8. A management system for managing memory capacity in accordance with claim 5, wherein said data capacity renewing means transmits the newest vacant capacity of said at least one of said remote mobile terminals to said management server, and makes said vacant capacity managing by said data capacity management means in said management server renew, at the time of the location registration of said at least one of said remote mobile terminals.

9. A management method for managing memory capacity at a management apparatus for memory capacity that manages data capacity of remote mobile terminals that communicate with each other via a network, in which said data capacity of said remote mobile terminals is managed, comprising:

judging whether data is to be transmitted to a remote mobile terminal, in response to a request for data from a network and a vacant storage capacity of a memory issued from said remote mobile terminal, by comparing vacant capacity of said remote mobile terminal, which is managed by said management apparatus for memory capacity, with the amount of said data to be transmitted to said remote mobile terminal;

obtaining some data for storing in said remote mobile terminal and storing said obtained data in said management apparatus for memory capacity, and causing said remote mobile terminal to make a new vacant capacity when said data to be transmitted to said remote mobile terminal were judged not to be transmitted; and transmitting said data to be transmitted, which were judged not to be transmitted, to said remote mobile terminal by using said new vacant capacity.

10. A management method for managing memory capacity in accordance with claim 9, further comprising:

renewing said vacant capacity of said remote mobile terminal managing by said management apparatus for memory capacity and managing said renewed vacant capacity by said management apparatus for memory capacity when said remote mobile terminal requests to obtain said data to be transmitted to said remote mobile terminal from said network.

11. A management method for managing memory capacity in accordance with claim 10, wherein said vacant capacity of said remote mobile terminal is renewed and managed by said management apparatus for memory capacity by receiving the information of said vacant capacity from said remote mobile terminal.

12. A management method for managing memory capacity at a management system for managing memory capacity, which provides remote mobile terminals that communicate with each other via a network and a management server that manages data capacity of said remote mobile terminals, in which said data capacity of each of said remote mobile terminals is managed, comprising:

transmitting a request for obtaining data from said network by a remote mobile terminal to said management server;

judging whether said data requested by said remote mobile terminal is transmitted to said remote mobile terminal by comparing vacant capacity of said remote mobile terminal, which is managed by said management server, with the amount of said data requested by said remote mobile terminal;

obtaining some data for storing in said remote mobile terminal and storing said obtained data in said management server, and causing said remote mobile terminal to make new vacant capacity when said data requested by said remote mobile terminal were judged not to be transmitted; and transmitting said data requested by said remote mobile terminal, which were judged not to be transmitted, to said remote mobile terminal by using said new vacant capacity.

13. A management method for managing memory capacity in accordance with claim 12, further comprising:

renewing said vacant capacity managing by said management server by transmitting the newest vacant capacity of said remote mobile terminal to said management server.

14. A management method for managing memory capacity in accordance with claim 13, wherein said vacant capacity of said remote mobile terminal is renewed by the newest vacant capacity of said remote mobile terminal being transmitted to said management server when said request for obtaining said data is transmitted to said management server.

15. A management method for managing memory capacity in accordance with, claim 13, wherein said vacant capacity of said remote mobile terminal is renewed by the newest vacant capacity of said remote mobile terminal being transmitted to said management server at the time of connection of an external instrument to an interface connector of said remote mobile terminal.

16. A management method for managing memory capacity in accordance with claim 13, wherein said vacant capacity of said remote mobile terminal is renewed by the newest vacant capacity of said remote mobile terminal being transmitted to said management server at a time of location registration of said remote mobile terminal.

17. A management program on a computer-readable medium, said program including instructions executable by a computer for performing a management method for managing memory capacity at a management apparatus for memory capacity that manages data capacity of remote mobile terminals that communicate with each other via a network, in which said data capacity of each of said remote mobile terminals is managed, said method comprising:
   judging, in response to a request for data from a network arid a vacant storage capacity of a memory issued from a remote mobile terminal, whether data to be transmitted to a remote mobile terminal is transmitted to said remote mobile terminal, by comparing vacant capacity of said remote mobile terminal, which is managed by said management apparatus for memory capacity, with the amount of said data to be transmitted to said remote mobile terminal;
   obtaining some data for storing in said remote mobile terminal and storing said obtained data in said management apparatus for memory capacity, and causing said remote mobile terminal make new vacant capacity when said data to be transmitted to said remote mobile terminal were judged not to be transmitted; and
   transmitting said data to he transmitted, which were judged not to be transmitted, to said remote mobile terminal by using said new vacant capacity.

18. A management program for managing memory capacity in accordance with claim 17, further comprising:
   renewing said vacant capacity of said remote mobile terminal managed by said management apparatus for memory capacity and managing said renewed vacant capacity by said management apparatus for memory capacity when said remote mobile terminal requests to obtain said data to be transmitted to said remote mobile terminal from said network.

19. A management program for managing memory capacity in accordance with claim 18, wherein said vacant capacity of said remote mobile terminal is renewed and managed by said management apparatus for memory capacity by receiving the information of said vacant capacity from said remote mobile terminal.

20. A management program on a computer-readable medium, said program including instructions executable by a computer for performing a management method for managing memory capacity at a management system for memory capacity, which provides remote mobile terminals that communicate with each other via a network and a management server that manages data capacity of each of said remote mobile terminals, in which said data capacity of each of said remote mobile terminals is managed, said method comprising:
   transmitting a request for obtaining data, from said network by a remote mobile terminal to said management server;
   judging whether said data requested by said remote mobile terminal is transmitted to said remote mobile terminal, by comparing vacant capacity of said remote mobile terminal, which is managed by said management server, with the amount of said data requested by said remote mobile terminal;
   obtaining some data for storing in said remote mobile terminal and storing said obtained data in said management server, and causing said remote mobile terminals make new vacant capacity when said data requested by said remote mobile terminal were judged not to be transmitted; and
   transmitting said data requested by said remote mobile terminal, which were judged not to be transmitted, to said remote mobile terminal by using said new vacant capacity.

21. A management program for managing memory capacity in accordance with claim 20, further comprising:
   renewing said vacant capacity managing by said management server by transmitting the newest vacant capacity of said remote mobile terminal to said management server.

22. A management program for managing memory capacity in accordance with claim 21, wherein said vacant capacity of said remote mobile terminal is renewed by the newest vacant capacity of said remote mobile terminal being transmitted to said management server when said request for obtaining said data is transmitted to said management server.

23. A management program for managing memory capacity in accordance with claim 21, wherein said vacant capacity of said remote mobile terminal is renewed by the newest vacant capacity of said remote mobile terminal being transmitted to said management server at a time of connection of an external instrument to an interface connector of said remote mobile terminal.

24. A management program for managing memory capacity in accordance with claim 21, wherein said vacant capacity of said remote mobile terminal is renewed by the newest vacant capacity of said remote mobile terminal being transmitted to said management server at a time of location registration of said remote mobile terminal.

25. A management system for managing memory capacity, comprising:
   a plurality of remote mobile terminals that communicate with each other via a network; and
   a management server that transmits data, wherein at least one of said plurality of remote mobile terminals requests said management server to obtain data from said network, for transmission to said remote mobile terminal, wherein:
   said remote mobile terminal, comprising:
      data storing means that stores data obtained from said network, and said management server, comprising:
      data memorizing means that stores data from said remote mobile terminal; and
      judging means that judges whether said data requested by said remote mobile terminal are stored in said data storing means of said remote mobile terminal by managing vacant capacity of said remote mobile terminal, wherein, when said judging means judged that said data requested by said remote mobile terminal were not stored in said data storing means said management server obtains some data in said data storing means of said remote mobile terminal and stores said obtained data in said data memorizing means, and causes said data storing means to make new vacant capacity, and said management server transmits said data requested by said remote mobile terminal, which were judged not to be stored, to said remote mobile terminal by using said new vacant capacity.

26. A management system for managing memory capacity, comprising:
a plurality of remote mobile terminals that communicate with each other via a network; and
a management server that transmits data, wherein at least one of said plurality of remote mobile terminals requests said management server to obtain data from said network, for transmission to said remote mobile terminal,
wherein said remote mobile terminal comprises:
a data storing means that stores data obtained from said network; and
a judging means that judges whether said data requested by said remote mobile terminal are stored in said data storing means by managing vacant capacity of said remote mobile terminal, and
wherein said management server comprises:
a data memorizing means that stores data from said remote mobile terminal,
wherein, when said judging means judged that said data requested by said remote mobile terminal were not stored in said data storing means said judging means makes said data memorizing means in said management server obtain some data in said data storing means of said remote mobile terminal, and lets said data storing means make new vacant capacity, and said judging means makes said management server transmit said data requested by said remote mobile terminal, which were judged not to be stored, to said remote mobile terminal by using said new vacant capacity.

27. A management system for managing memory capacity in accordance with claim 25, wherein each of said remote mobile terminals, further comprises:
a data capacity renewing means that makes said vacant capacity of each of said remote mobile terminals, which is managed by said management server, renew, by transmitting said vacant capacity to said management server.

28. A management system for managing memory capacity in accordance with claim 27, wherein said data capacity renewing means transmits said vacant capacity of each of said remote mobile terminals to said management server and makes said vacant capacity of each of said remote mobile terminals renew at the time of the location registration of each of said remote mobile terminals.

* * * * *